United States Patent
Kuo et al.

(10) Patent No.: US 9,580,986 B2
(45) Date of Patent: Feb. 28, 2017

(54) MUDLINE SUSPENSION METAL-TO-METAL SEALING SYSTEM

(75) Inventors: Hao-Ching Kuo, Friendswood, TX (US); Ashish Kumar, Uttar Pradesh (IN)

(73) Assignee: FMC Technologies, Inc., Houston, TX (US)

( * ) Notice: Subject to any disclaimer, the term of this patent is extended or adjusted under 35 U.S.C. 154(b) by 86 days.

(21) Appl. No.: 14/411,041

(22) PCT Filed: Jun. 28, 2012

(86) PCT No.: PCT/US2012/044496
§ 371 (c)(1),
(2), (4) Date: May 26, 2015

(87) PCT Pub. No.: WO2014/003745
PCT Pub. Date: Jan. 3, 2014

(65) Prior Publication Data
US 2015/0260001 A1 Sep. 17, 2015

(51) Int. Cl.
*E21B 33/043* (2006.01)
*E21B 33/038* (2006.01)
(Continued)

(52) U.S. Cl.
CPC .......... *E21B 33/043* (2013.01); *E21B 33/038* (2013.01); *E21B 33/1212* (2013.01);
(Continued)

(58) Field of Classification Search
CPC ...... E21B 33/04; E21B 33/043; E21B 33/038; E21B 33/1212; F16J 15/08; F16J 15/0806; F16J 15/0887
See application file for complete search history.

(56) References Cited

U.S. PATENT DOCUMENTS

| | | | |
|---|---|---|---|
| 4,355,825 A | * | 10/1982 | Leicht .................. E21B 33/043 166/115 |
| 4,390,186 A | | 6/1983 | McGee et al. |

(Continued)

OTHER PUBLICATIONS

PCT International Search Report and Written Opinion dated Mar. 19, 2013 for International Application No. PCT/US2012/044496.
(Continued)

*Primary Examiner* — Matthew R Buck
(74) *Attorney, Agent, or Firm* — Amerson Law Firm, PLLC

(57) ABSTRACT

Generally, the present disclosure is directed to metal-to-metal sealing systems and methods for use with the various pressure-retaining components, and in particular to pressure-retaining components that may be used in mudline suspension systems. In one illustrative embodiment, a system is disclosed that includes a first pressure-retaining component having an outside face, the outside face including first and second metal sealing surfaces proximate an end of the first pressure-retaining component, wherein the second metal sealing surface is positioned along the outside face between the first metal sealing surface and the end of the first pressure-retaining component. The system further includes, among other things, a second pressure-retaining component having an inside face, the inside face of the second pressure-retaining component including a third metal sealing surface that is adapted to sealingly engage at least the first metal sealing surface.

47 Claims, 11 Drawing Sheets

(51) Int. Cl.
*E21B 33/12* (2006.01)
*F16J 15/08* (2006.01)
(52) U.S. Cl.
CPC .......... *F16J 15/08* (2013.01); *F16J 15/0806* (2013.01); *F16J 15/0887* (2013.01)

(56) References Cited

U.S. PATENT DOCUMENTS

| | | |
|---|---|---|
| 4,979,566 A | 12/1990 | Hosie et al. |
| 5,174,376 A | 12/1992 | Singeetham |
| 5,240,081 A | 8/1993 | Milberger et al. |
| 5,655,603 A | 8/1997 | Schulte et al. |
| 5,813,470 A * | 9/1998 | Radi ................ E21B 33/04 166/208 |
| 6,668,919 B2 * | 12/2003 | Radi ................ E21B 33/04 166/208 |
| 8,950,752 B2 * | 2/2015 | Gette ................ E21B 33/03 166/382 |
| 2003/0000694 A1 | 1/2003 | Sweeney et al. |
| 2008/0048443 A1 | 2/2008 | Paton et al. |
| 2009/0322030 A1 * | 12/2009 | Pallini, Jr. ............ E21B 17/04 277/336 |

OTHER PUBLICATIONS

Brochure of Cameron Mudline Suspension System, Cooper Cameron Corporation, Cameron Division, Printed in USA, Dec. 1997, 10 pages.
Brochure of Dril-Quip MS-15 (TM) Mudline Suspension System, Dril-Quip, Inc. Printed in the USA, 1994, 20 pages.

* cited by examiner

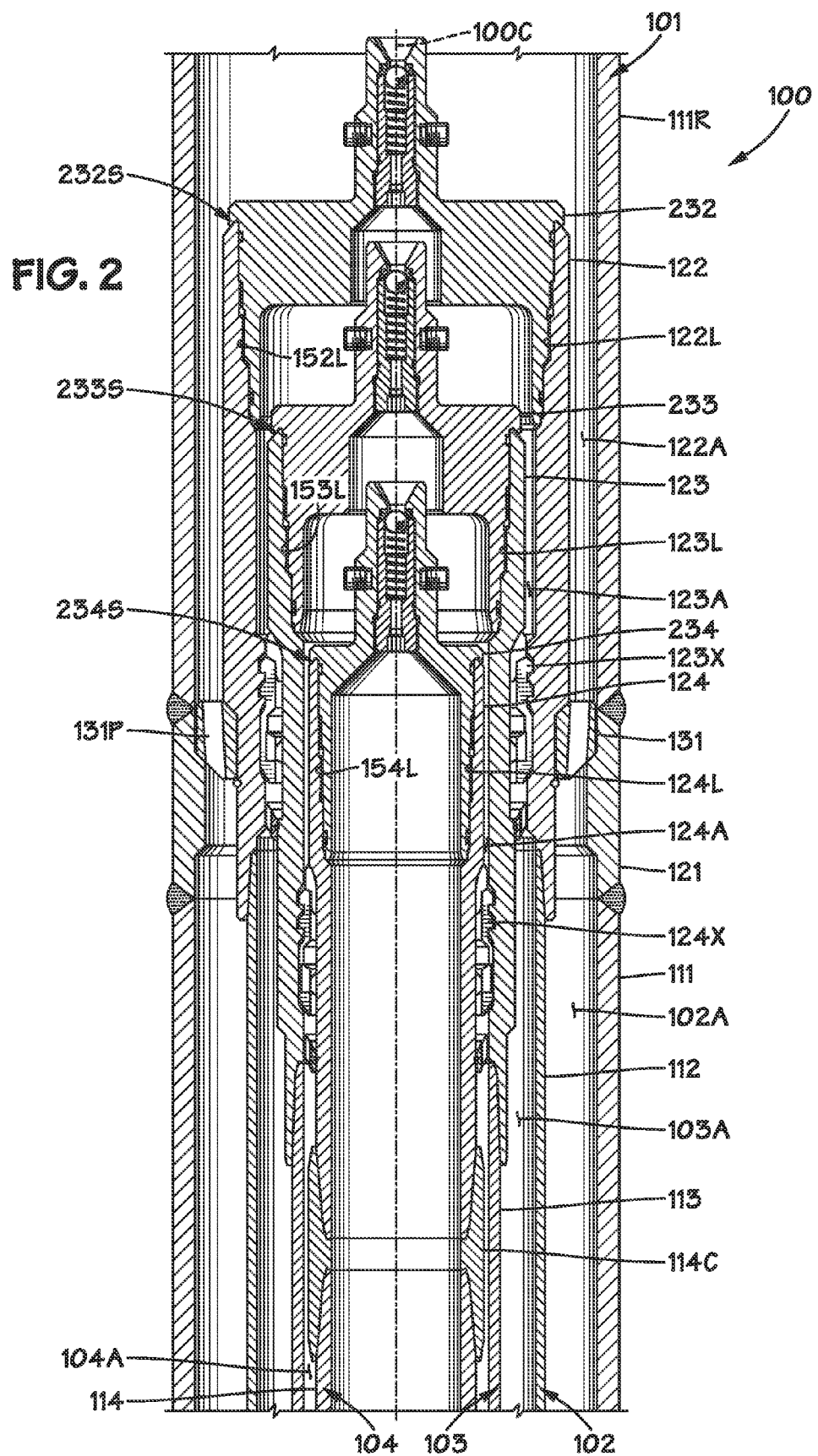

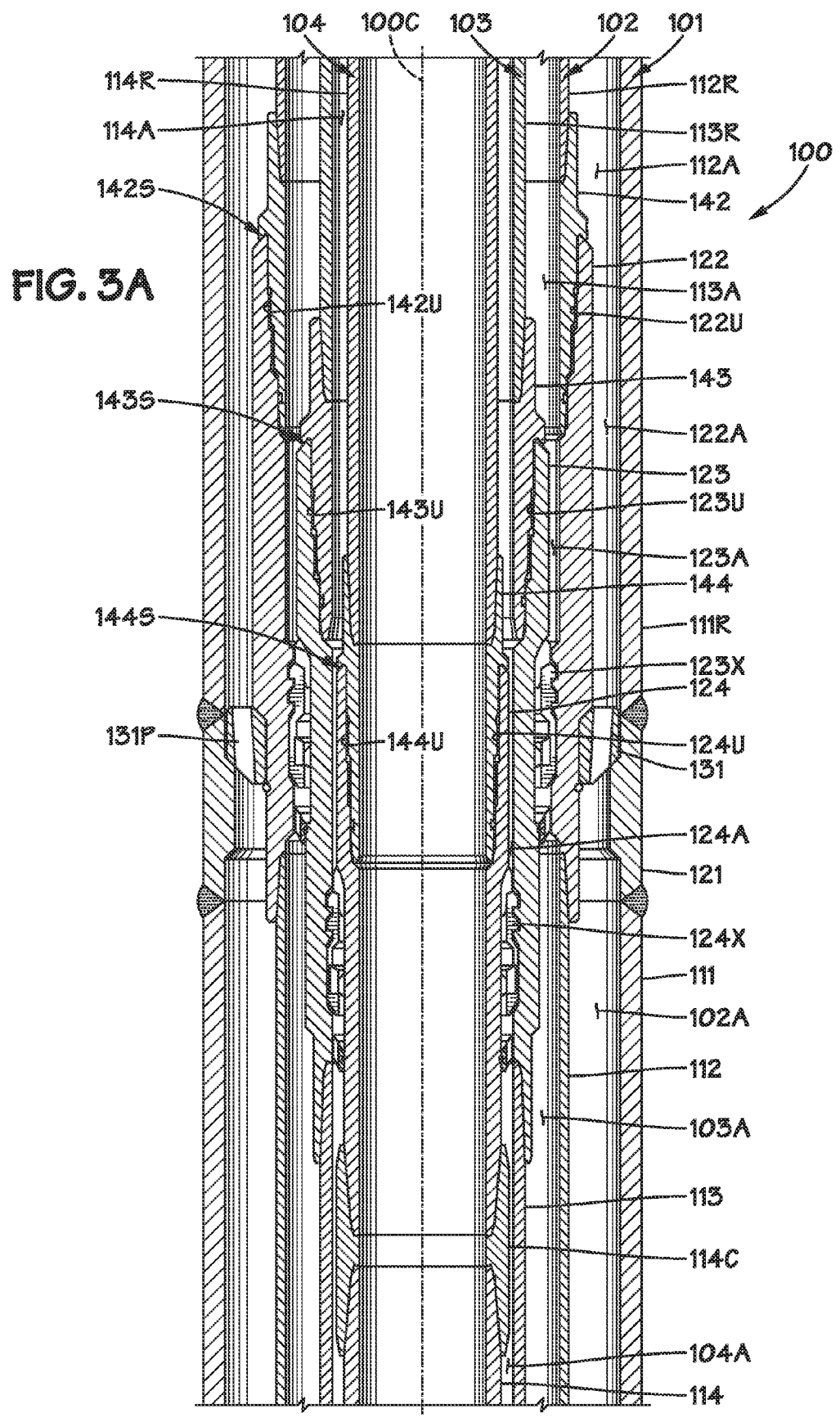

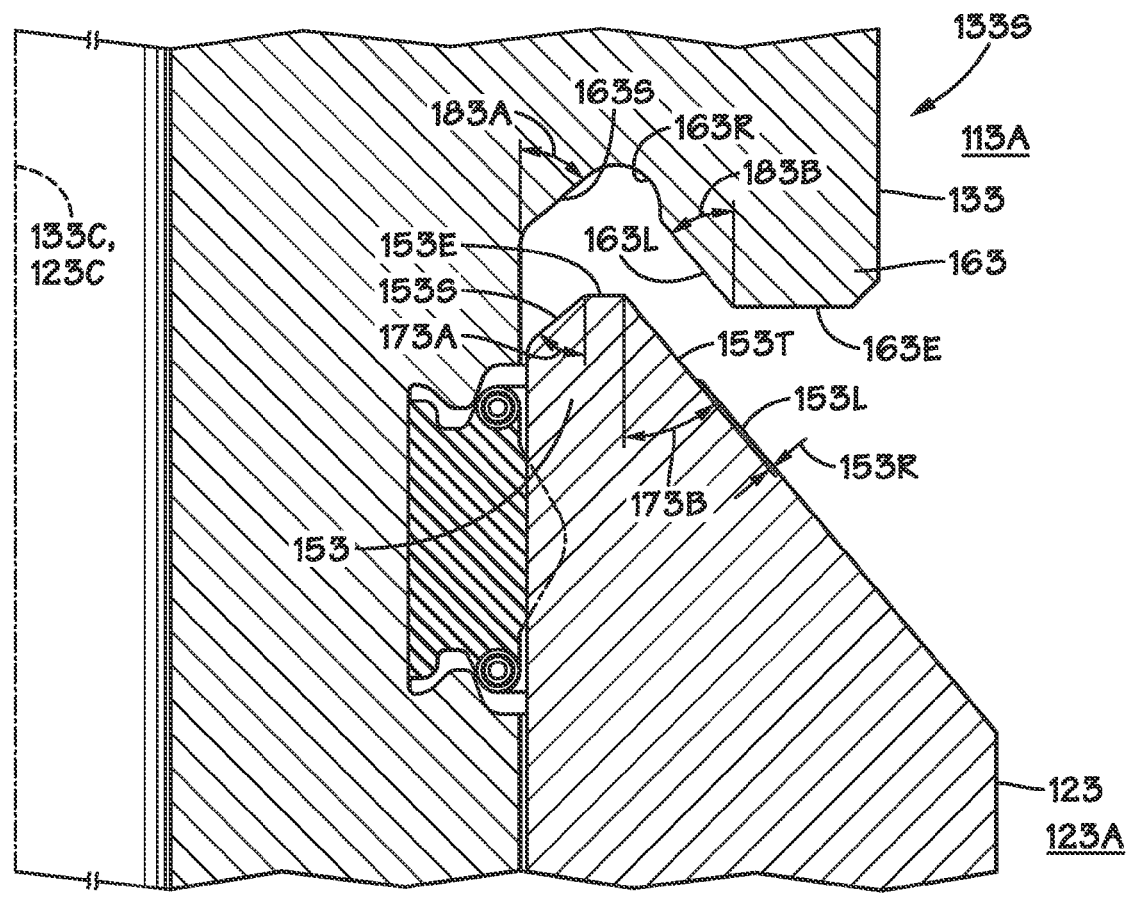

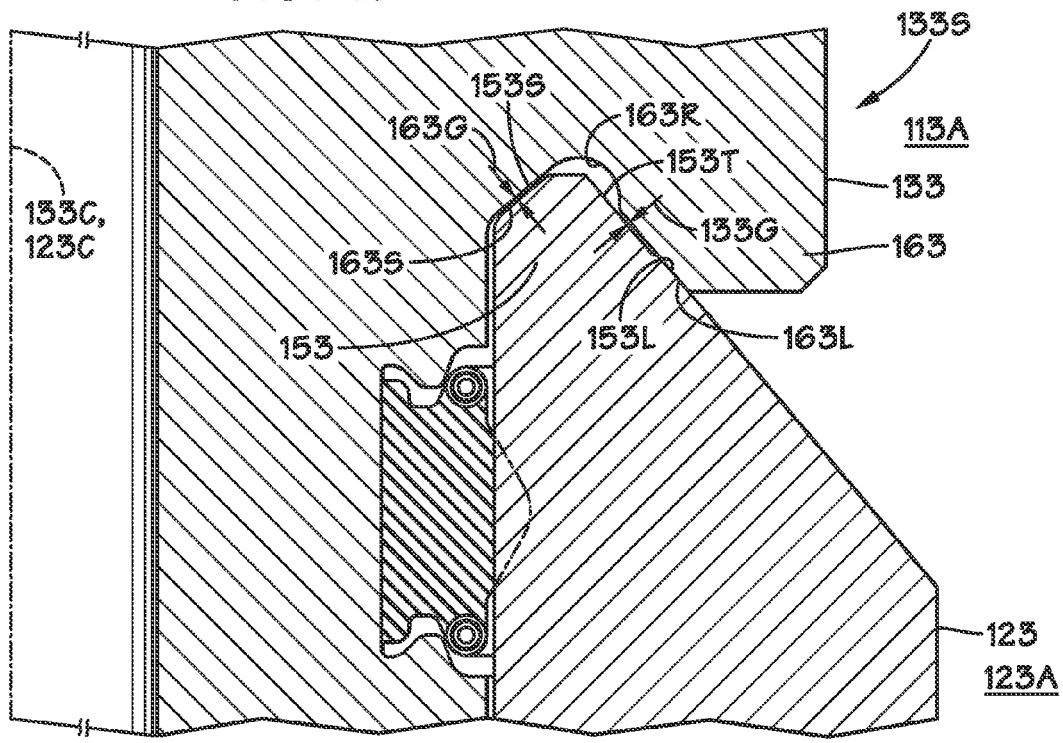
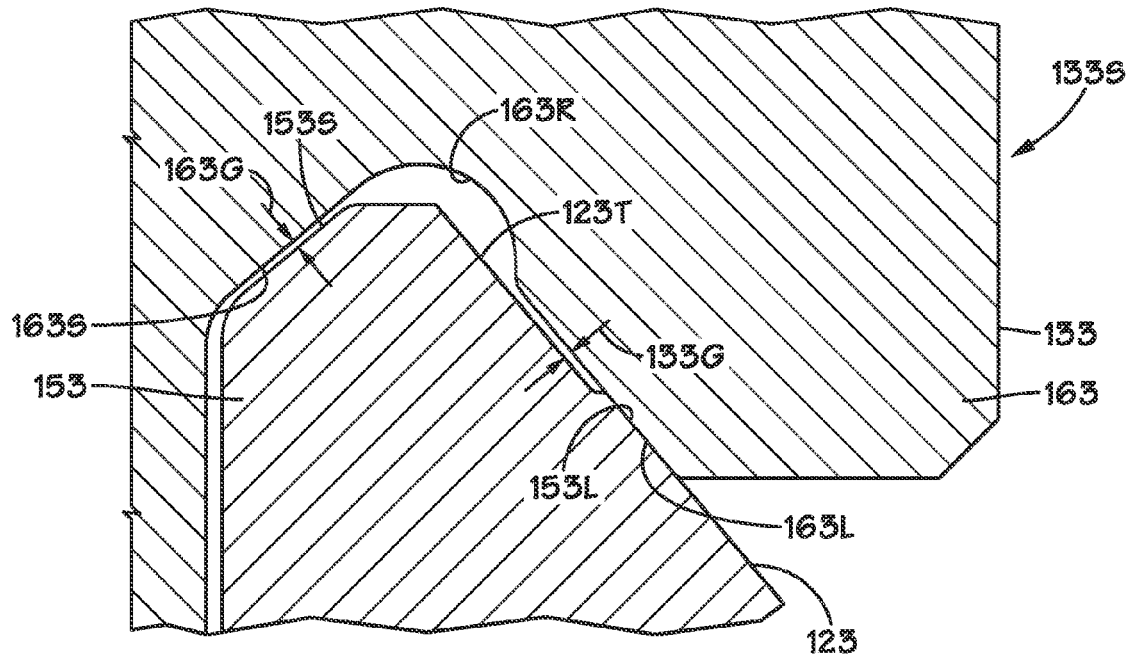

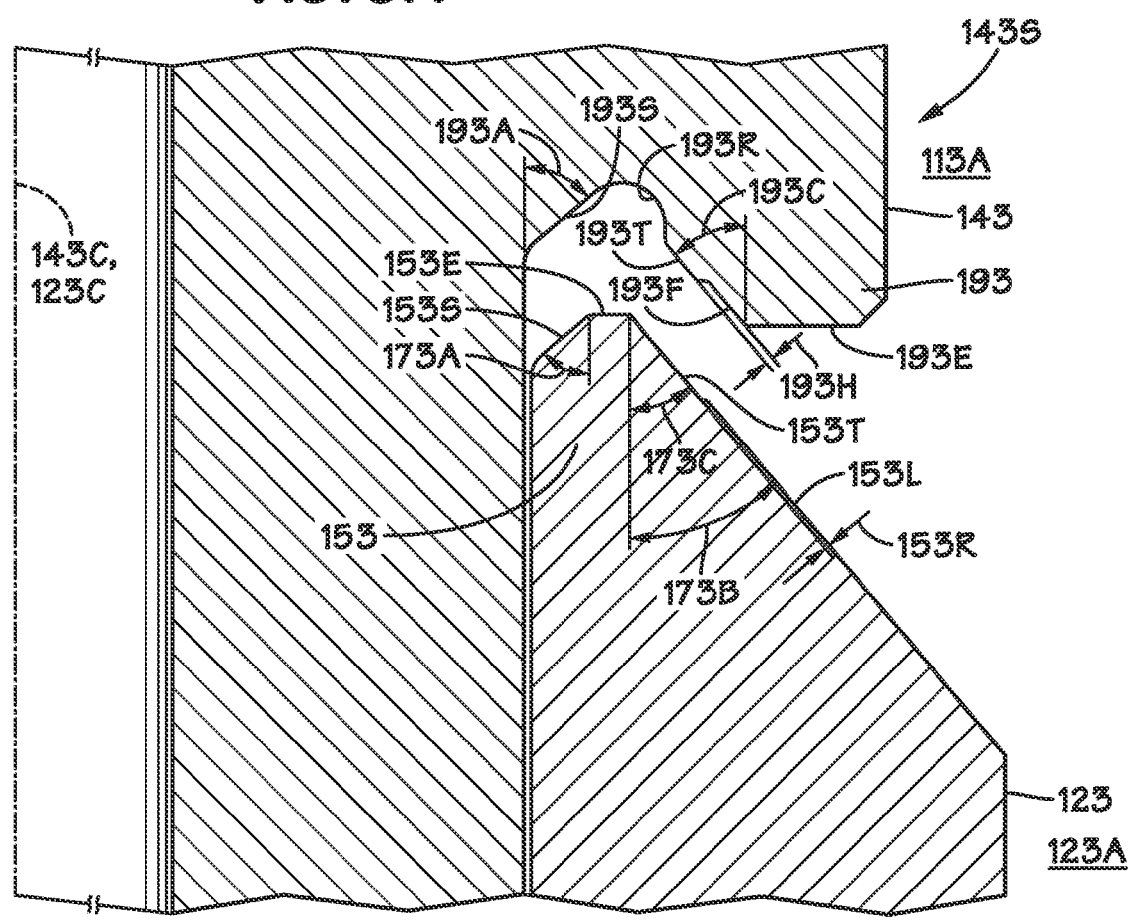

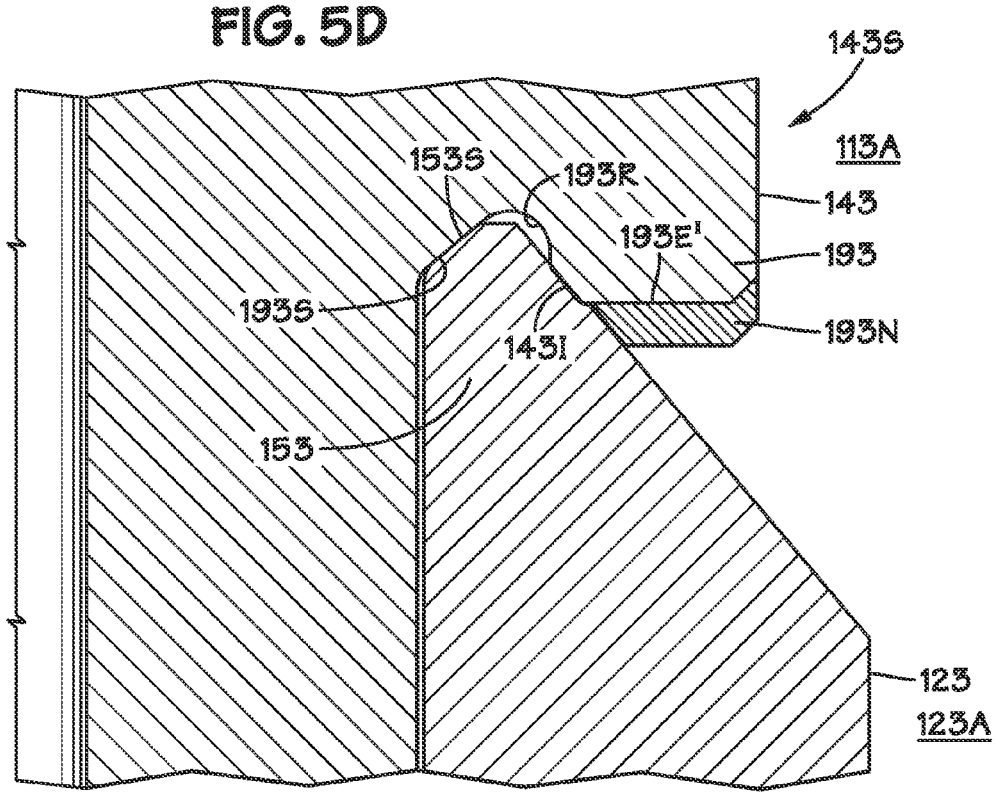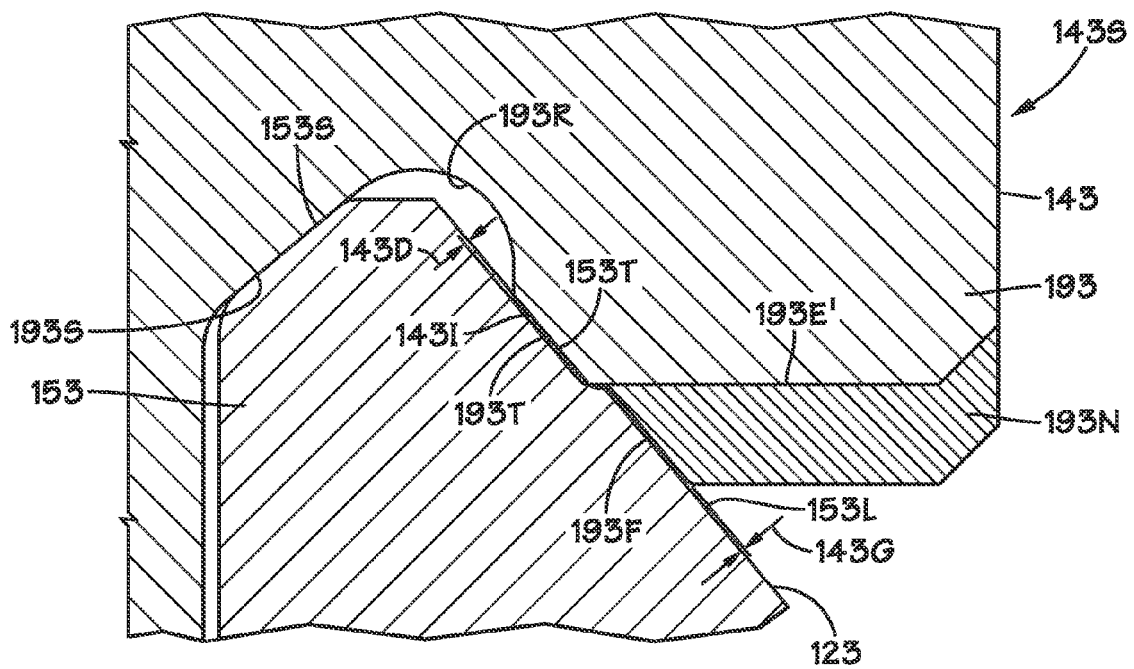

MUDLINE SUSPENSION METAL-TO-METAL SEALING SYSTEM

BACKGROUND OF THE INVENTION

1. Field of the Invention

Generally, the present invention relates to subsea wellhead systems, and more particularly to metal-to-metal sealing systems in mudline suspension systems.

2. Description of the Related Art

In many offshore oil and gas drilling operations, subsea wells are drilled using temporary drilling platforms, such as jack-up rigs, floating rigs, and the like, the specific type and design of which may depend on various drilling and environmental factors, such as water depth, target drilling depth, and the like. Unlike those situations where a subsea well is drilled using a conventional fixed offshore drilling platform—which is commonly designed to support a significant portion of the weight of the various casing strings installed in the well during drilling operations—the weight of the well is not borne by the jack-up or floating rig, but is instead typically supported by a so-called mudline suspension system. In a mudline suspension system, the weight of the various casing strings and other well components are supported at the sea bed, or mudline, which thereby enables a substantial reduction in the size and weight of the structural components needed in the structure of the temporary drilling platform, which can primarily be design to provide lateral stability during drilling operations to those portions of the well casing rising above the sea floor.

Typically, once a temporary drilling platform, e.g., a jack-up or floating drilling rig, has completed the drilling and testing operations on given subsea well, the sections of casing that rise above the wellhead at the sea floor are removed, each casing string is capped at the subsea wellhead, and the well may be temporarily abandoned for a period of time prior to the commencement of production. Temporary abandonment of the subsea well may in some cases last for several months, depending on several factors, such as the age of the field, the number of adjacent wells, the presence of and distance to an existing production platform, and the like. Thereafter, once an offshore production platform—which may gather production from a single subsea well or from multiple wells adjacent well—has been brought into position, the well is then reconnected, or tied back, to the production platform, and oil and gas production from the well may begin.

While the use of mudline suspension systems in offshore oil and gas wells may provide substantial benefits in both drilling and production operations, locating the various casing hangers and other related complex connections at the mudline may impose several technical challenges. For example, access to the subsea wellhead may be severely limited, particularly in those cases where the water depth may range to 2000-3000 feet, or even greater. In such cases, routine equipment maintenance and/or repair of the wellhead components may be problematic. Accordingly, great emphasis is generally placed on robust and reliably engineered sealing systems, since any repairs that may be required for leaking or malfunctioning wellheads in a subsea environment are difficult, if not practically impossible, to perform. Sealing system reliability is of even greater importance in high pressure/high temperature (HPHT) wellhead applications, which may operate under pressures in excess of 10,000 psi and temperatures above 250° F.

One particular aspect of prior art mudline suspension systems where sealing system problems and/or failures have occurred is with the various pressure-retaining components such as casing hangers and their related landing, abandonment, and/or tieback connections. As noted above, many subsea oil and gas wells may experience a drilling phase, an abandonment phase, and a production phase, during which time at least some of the seals on a given casing hanger may experience multiple sealing and unsealing cycles, sometimes referred to as "make/break" cycles. The following sealing system life-cycle description is typical for the life of an exemplary casing hanger seal.

Typically, the sealing surface of a casing hanger experiences a first sealing cycle in the shop where it is initially manufactured when it is connected to and tested with a landing subassembly, or landing sub, so called because it is used to "land" or install the casing hanger and casing inside of a drilled wellbore. In most cases, the casing hanger and the landing sub remain in this connected and sealed configuration throughout the step of landing, or installing, the assembled casing, casing hanger and landing sub in the well, after which the casing string is cemented in place. In at least some applications, this first seal between the casing hanger and the landing sub is then broken so that a back-wash step for removing cement and/or other debris from the annular space outside of the casing hanger can be performed. Once the back-wash step is complete, the landing sub is then re-engaged with the casing hanger, thus creating a second sealing cycle on the sealing surface of the casing hanger.

After the completion of all drilling and testing operations on the well, the second seal between the casing hanger and the landing sub is broken so that the casing riser string and the landing sub can be removed in preparation for temporary abandonment of the well. Thereafter, a temporary abandonment cap, or TA cap, is installed on the casing hanger, thus imposing a third sealing cycle on the sealing surface of the casing hanger. The TA cap then remains in place until production operations are ready to commence, at which time the third seal between the casing hanger and the TA cap is broken so that the well can be re-opened and re-connected, or tied back, to a production platform. A casing riser string and tieback subassembly, or tieback sub, that is used for tying the well back to the production platform is then lowered into place and connected to the casing hanger, thus imposing a fourth sealing cycle on the sealing surface of the casing hanger.

As may be appreciated, deformation and/or surface damage to the various sealing surfaces of a typical mudline suspension system can occur during any one or more of the sealing cycles described above. Furthermore, surface damage and/or deformation problems are often much less forgiving in HPHT applications, where metal-to-metal seals are normally employed due to the inherent temperature limitations of many elastomeric seal materials, and the commensurately reduced durability and reliability thereof. Moreover, since high-nickel alloy materials are used for many HPHT wellhead applications, the galling problems associated with sliding engagement of metal-to-metal sealing surfaces are also much more prevalent.

Accordingly, there is a need to develop metal-to-metal sealing systems and configurations that may overcome, or at least mitigate, one or more of the problems associated with the various sealing, unsealing, and resealing operations that are performed on a typical mudline suspension system as described above.

SUMMARY OF THE DISCLOSURE

The following presents a simplified summary of the present disclosure in order to provide a basic understanding of some aspects disclosed herein. This summary is not an exhaustive overview of the disclosure, nor is it intended to identify key or critical elements of the subject matter disclosed here. Its sole purpose is to present some concepts in a simplified form as a prelude to the more detailed description that is discussed later.

Generally, the present disclosure is directed to metal-to-metal sealing systems and methods for use with the various pressure-retaining components, and in particular to pressure-retaining components that may be used in mudline suspension systems. In one illustrative embodiment, a system is disclosed that includes a first pressure-retaining component having a first contact stop surface and an outside face, the outside face including first and second metal sealing surfaces proximate an end of the first pressure-retaining component, wherein the second metal sealing surface is positioned along the outside face between the first metal sealing surface and the end of the first pressure-retaining component. The system further includes, among other things, a second pressure-retaining component having a second contact stop surface and an inside face, the inside face of the second pressure-retaining component including a third metal sealing surface that is adapted to sealingly engage at least the first metal sealing surface, wherein the second contact stop surface is adapted to contact the first contact stop surface as the third metal sealing surface sealingly engages the first metal sealing surface.

Also disclosed herein is another illustrative system that includes a first pressure-retaining component having first and second frustoconical metal sealing surfaces proximate an end of the first pressure-retaining component and on an outside face thereof, wherein the second frustoconical metal sealing surface is positioned along the outside face between the first frustoconical metal sealing surface and the end of the first pressure-retaining component. The system also includes, among other things, a second pressure-retaining component having a third frustoconical metal sealing surface proximate an end of the second pressure-retaining component and on an inside face thereof, wherein the third frustoconical metal sealing surface is adapted to sealingly engage at least the first frustoconical metal sealing surface. Additionally, the system includes a third pressure-retaining component having a fourth frustoconical metal sealing surface proximate an end of the third pressure-retaining component and on an inside face thereof, wherein the fourth frustoconical metal sealing surface is adapted to sealingly engage at least the second frustoconical metal sealing surface.

In another illustrative embodiment disclosed herein, a casing hanger includes, among other things, a first metal sealing surface proximate an end of the casing hanger, wherein the first metal sealing surface is adapted to sealingly engage at least one of a metal sealing surface of a landing subassembly and a metal sealing surface of a temporary abandonment cap. The disclosed casing hanger further includes a second metal sealing surface positioned between the first metal sealing surface and the end of the casing hanger, wherein the second metal sealing surface is adapted to sealingly engage a metal sealing surface of a tieback subassembly.

The present subject matter also discloses a method that includes, among other things, attaching a first pressure-retaining component having a first metal sealing surface to a second pressure-retaining component having a second metal sealing surface, wherein the first metal sealing surface is proximate a first end of the first pressure-retaining component and on an inside face thereof, and the second metal sealing surface is proximate a second end of the second pressure-retaining component and on an outside face thereof. Furthermore, the method includes, after attaching the first pressure-retaining component to the second pressure-retaining component, engaging a first metal-to-metal seal between the first metal sealing surface and the second metal sealing surface, wherein engaging the first metal-to-metal seal includes, among other things, covering at least a portion of a recessed metal sealing surface of the second pressure-retaining component with at least a portion of the first pressure-retaining component so as to define a gap therebetween, the recessed metal sealing surface being on the outside face of the second pressure-retaining component between the second metal sealing surface and the second end. Furthermore, engaging the first metal-to-metal seal also includes engaging the first metal sealing surface with the second metal sealing surface until a first contact stop surface of the first pressure-retaining component contacts a second contact stop surface of the second pressure-retaining component (123).

BRIEF DESCRIPTION OF THE DRAWINGS

The disclosure may be understood by reference to the following description taken in conjunction with the accompanying drawings, in which like reference numerals identify like elements, and in which:

FIG. 2 depicts a cross-sectional view of another illustrative embodiment of a mudline suspension system using temporary abandonment caps with an embodiment of the metal-to-metal sealing system of the present disclosure;

FIG. 3A shows a cross-sectional view of one embodiment of a mudline suspension system with illustrative tieback subassemblies and casing hangers using an illustrative embodiment of the metal-to-metal sealing system disclosed herein;

FIGS. 4A-4E are various close-up cross-sectional views of the illustrative metal-to-metal sealing system of the casing hanger and landing subassembly of FIGS. 1B and 1C during various stages of assembly; and FIGS. 5A-5E are various close-up cross-sectional views of the illustrative metal-to-metal sealing system of the casing hanger and tieback subassembly of FIGS. 3B and 3C during various stages of assembly.

Figure 1A:
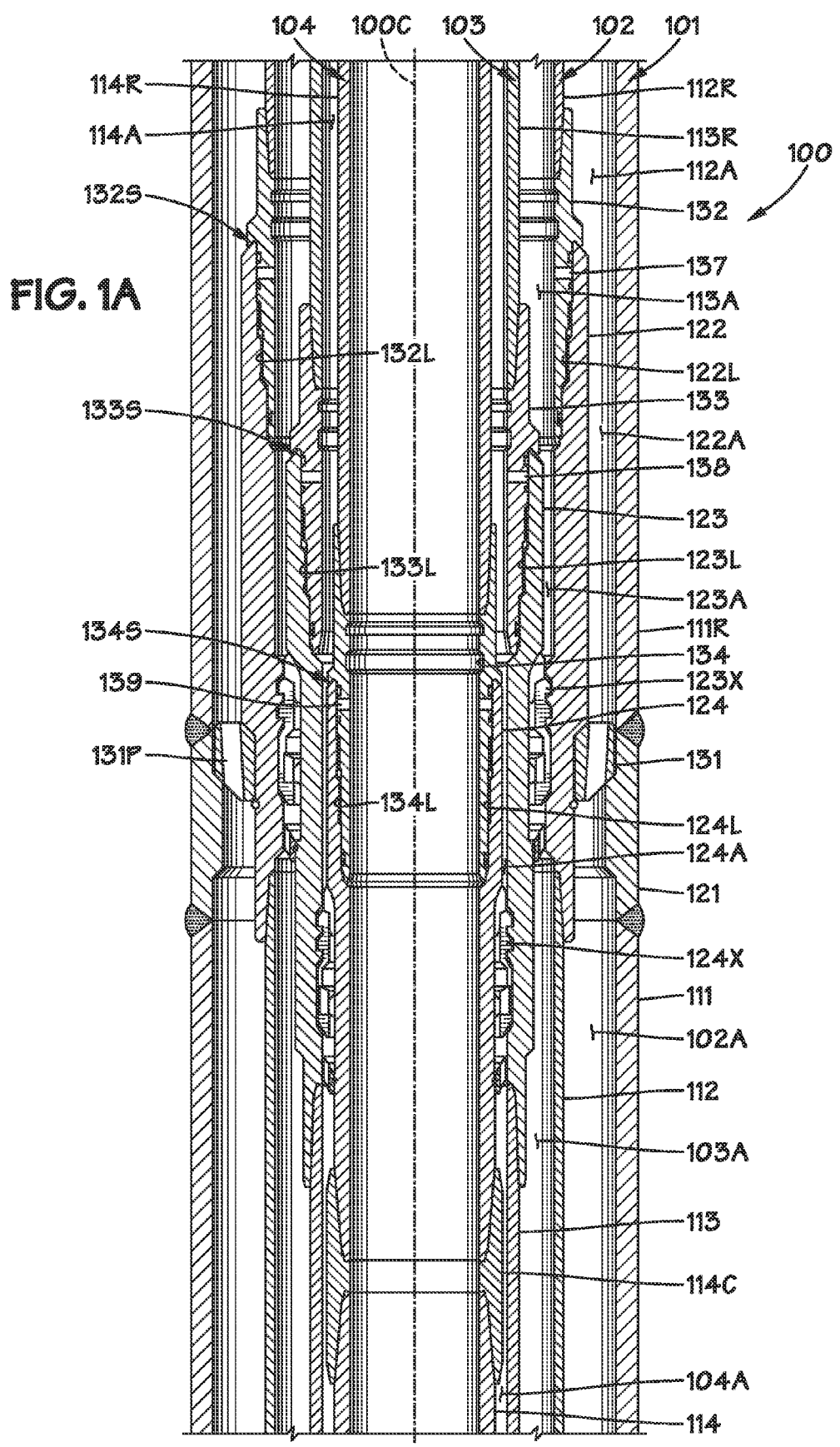
FIG. 1A is a cross-sectional view of one illustrative embodiment of a mudline suspension system with illustrative landing subassemblies and casing hangers using an exemplary metal-to-metal sealing system of the present disclosure.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the subject matter disclosed herein is directed to metal-to-metal sealing systems for various pressure-retaining components of a mudline suspension systems, such as casing hangers, landing subassemblies, temporary abandonment caps, tieback subassemblies, and the like. In some illustrative embodiments, one or more of the casing hangers used in an exemplary mudline suspension system may include different metal sealing surfaces, each of which are adapted to create metal-to-metal seals with different mating components during the different phases of drilling and production operations. For example, in certain embodiments, a casing hanger may have a first metal sealing surface proximate an upper end of the casing hanger that is adapted to engage with a corresponding metal sealing surface on a respective landing subassembly, or landing sub, thereby creating a first metal-to-metal seal during the various drilling operations that may be performed on a subsea well. Additionally, the same casing hanger may also have a second metal sealing surface adjacent to the first metal sealing surface that is adapted to engage with a corresponding metal sealing surface on a respective tieback subassembly, or tieback sub, thereby creating a second metal-to-metal seal during production operations on the well. Furthermore, in at least some embodiments of the metal-to-metal sealing system disclosed herein, the second metal sealing surface of the casing hanger may be substantially protected from the potentially damaging effects of any loose materials, such as debris, cement, and the like, that may be present in the annular space surrounding the casing hanger.

Turning now to the above-listed figures, FIG. 1A is a cross-sectional view of an illustrative mudline suspension system 100 that utilizes one embodiment of the metal-to-metal sealing system disclosed herein. More specifically, FIG. 1A depicts an embodiment of the mudline suspension system during one phase of a drilling operation, wherein each of several landing subassemblies, or landing subs, have been landed on and engaged with respective casing hangers, as will be further discussed in additional detail below.

As shown in FIG. 1A, the mudline suspension system 100 may include an outermost conductor casing string 101, which may be made up of a lowermost conductor casing 111, which may have a buttweld subassembly, or buttweld sub, 121 attached at its upper end, and a conductor casing riser 111R that may be attached to an upper end of the buttweld sub 121. During the initial stages of a drilling operation, the conductor casing string 101, so called because it "conducts," or transfers, the load of the various casing strings in the well into the soil of the sea bed, may be "landed," or set, in the sea bed by any one of several conventional techniques well known in the art, such as driving, water jetting, or drilling and cementing in place. In some embodiments, the conductor casing string 101 is set to such a depth so that the mudline suspension system depicted in FIG. 1A is approximately 15-30 feet below the mudline, or surface of the sea bed so that the load from the various casing strings in the well can be properly transferred through the conductor casing string and into the soil of the sea bed. Furthermore, in certain embodiments, the conductor casing string 101 may be sized and set such that the lower end of the lowermost conductor casing 111 may be at a relatively shallow depth, such as approximately 300 feet below the mudline, although it should be appreciated that the conductor casing 111 may also be set at either shallower or deeper depths. Thereafter, drilling operations may continue through the inside of the conductor casing string 101 so as to increase the overall depth of the well, and so that additional casing strings may be set inside of the casing string 101, as will now be further described.

After a first portion of the wellbore has been drilled inside of the conductor casing string 101 to a desired depth, a surface casing string 102 may be positioned inside of the conductor casing string 101. The surface casing string may include a lowermost surface casing 112 attached to the lower end of a first casing hanger 122, a surface casing landing sub 132 attached to the upper end of the first casing hanger 122, and a surface casing riser 112R attached to the upper end of the surface casing landing sub 132. Furthermore, a metal-to-metal sealing system 132S in accordance with the present disclosure may be used to create an appropriate pressure-tight seal between a metal sealing surface at the upper end of the first casing hanger 122 and a corresponding mating metal sealing surface on the surface casing landing sub 132, as will be further detailed with respect to an exemplary embodiment of a metal-to-metal sealing system illustrated in FIGS. 4A-4E and described below. In some embodiments, the surface casing string 102 may be landed on and supported by a load shoulder on load ring 131 that is adapted to interface with a corresponding load shoulder on the first casing hanger 122 as shown in FIG. 1A. The load ring 131 may in turn be supported by a corresponding load shoulder on the buttweld sub 121 of the conductor casing string 101.

In certain embodiments, the surface casing string 102 may be positioned inside of the conductor casing string 101 so that a series of interconnected annular spaces are formed between the outside surfaces of the various components of the surface casing string 102 and the corresponding inside surfaces of the various components of the conductor casing string 101. Generally, this series of annular spaces may include a lower annulus 102A in the area of the surface casing 112, an intermediate annulus 122A in the area of the first casing hanger 122, and an upper annulus 112A in the area of the surface casing landing sub 132 and the surface casing riser 112R. In some embodiments, fluid communication between the annuluses 112A and 122A above the load ring 131 and the annulus 102A below the load ring 131 may be facilitated by a plurality of flow ports 131P through the body of the load ring 131.

After the surface casing string 102 has been landed as described above, it may thereafter be cemented in place, a second portion of the wellbore may then be drilled through the inside of the surface casing string 102 to a desired depth, after which an intermediate casing string 103 may be landed inside of the surface casing string 102. In certain embodiments, the intermediate casing string 103 may include a lowermost intermediate casing 113 attached to the lower end of an second casing hanger 123, an intermediate casing landing sub 133 attached to the upper end of the second casing hanger 123, and an intermediate casing riser 113R attached to the upper end of the intermediate casing landing sub 133. Additionally, a metal-to-metal sealing system 133S of the present disclosure may be used to create a seal between a metal sealing surface at the upper end of the second casing hanger 123 and a corresponding mating metal sealing surface on the intermediate casing landing sub 133. See, e.g., FIGS. 4A-4E, described below. Furthermore, the intermediate casing string 103 may also include an appropriately designed expanding spring hanger 123X that is adapted to interface on the inside with a load shoulder on the second casing hanger 123 and on the outside with one or more load shoulders on the first casing hanger 122, thereby transferring the load of the intermediate casing string 103 to the first casing hanger 122 when the intermediate casing string 103 is landed inside of the surface casing string 102 as shown in FIG. 1A.

As described above with respect to the surface casing string 102 and the conductor casing string 101, in at least some embodiments of the present disclosure, the intermediate casing string 103 may be positioned inside of the surface casing string 102 so that a series of interconnected annular spaces are formed between the outside surfaces of the intermediate casing string 103 components and the corresponding inside surfaces of the surface casing string 102 components. For example, a lower annulus 103A may be present in the area of the intermediate casing 113, an intermediate annulus 123A may be present in the area of the second casing hanger 123 and the expanding spring hanger 123X, and an upper annulus 113A may be present in the area of the intermediate casing landing sub 133 and the intermediate casing riser 113R. In certain illustrative embodiments, fluid communication between the annuluses 113A and 123A above the expanding spring hanger 123X and the annulus 103A below the expanding spring hanger 123X may be facilitated by a plurality of grooves and passages (not shown) in the expanding spring hanger 123X.

After the intermediate casing string 103 has been landed and cemented in place, a third portion of the wellbore may then be drilled through the inside of the intermediate casing string 103 to a next desired depth, after which an innermost production casing string 104 may be landed inside of the intermediate casing string 103. In some illustrative embodiments, the production casing string 104 may have a similar configuration to intermediate casing string described above. For example, the production casing string 104 may include a lowermost production casing 114 attached directly to the lower end of a third casing hanger 124, whereas in certain embodiments the production casing 114 may be attached to the lower end of the third casing hanger 124 by way of an appropriate coupling 114C. Furthermore, it should be appreciated that, depending on the specific design configuration of each of the other casing strings 102 and 103 positioned inside of the conductor casing 101, a similarly designed coupling (not shown) may also be used to attached one or more of the casing strings 112, 113 to the respective casing hangers 122, 123.

In some exemplary embodiments, the production casing string 104 may also include a production casing landing sub 134 attached to the upper end of the third casing hanger 124 and production casing riser 114R attached to the upper end of the production casing landing sub 134. Furthermore, a metal-to-metal sealing system 134S in accordance with the present disclosure may be used to affect a seal between a metal sealing surface at the upper end of the third casing hanger 124 and a corresponding mating metal sealing surface on the production casing landing sub 134, as shown in FIGS. 4A-4E and described below. Additionally, and similar to the intermediate casing string 103 described above, the production casing string 104 may also include an appropriately designed expanding spring hanger 124X that is adapted to interface on the inside with a load shoulder on the third casing hanger 124 and on the outside with one or more load shoulders on the second casing hanger 123, thereby transferring the load of the production casing string 104 to the second casing hanger 123 when the production casing string 104 is landed inside of the intermediate casing string 103 as shown in FIG. 1A.

Additionally, the production casing string 104 may be positioned inside of the intermediate casing string 103 so that a series of interconnected annular spaces are formed between the outside surfaces of the various components of the production casing string 104 and the corresponding inside surfaces of the intermediate casing string 103. For example, a lower annulus 104A may be present in the area of the intermediate casing 114 and/or the coupling 114C, an intermediate annulus 124A may be present in the area of the third casing hanger 124 and the expanding spring hanger 124X, and an upper annulus 114A may be present in the area of the production casing landing sub 134 and the production casing riser 114R.

As shown in FIG. 1A, the mudline suspension system 100 may have a substantially common centerline axis 100C, such that the centerline axis of each casing string 101-104 is substantially co-linear with, or at least substantially parallel to, the centerline axis 100C. Accordingly, in at least some illustrative embodiments, the centerline axis of at least some of the individual components making up each of the casing strings 101-104 may also be substantially co-linear with, or at least substantially parallel to, the centerline axis 100C.

It should be appreciated that the specific casing program for the mudline suspension system 100 illustrated in FIG. 1A, i.e., including four casing strings 101-104, is exemplary only, as any given casing program used for a subsea oil and gas well may include either a fewer number of total casing strings or a greater number of total casing strings. For example, oil and gas wells having a relatively shallow target depth may have a fewer total number of casing strings, such as only three or four, whereas wells that are drilling to a greater target depth may have more casing strings, such as a total of five or more casing strings. However, irrespective of the total number of casing strings in a given casing program, in general, the outermost casing string will be the conductor casing, the next casing string inside of the conductor casing will be the surface casing, the innermost casing string will be the production casing, and any casing strings between the surface casing and the production casing will be various intermediate casings.

Furthermore, it should also be understood that any metal-to-metal sealing system of the present disclosure, such as the metal-to-metal sealing systems 132S, 133S and/or 134S, may be used on any or all of the casing hanger/landing sub connections used for the specific mudline suspension system and casing program utilized, and irrespective of the specific size (diameter) of the various components. For example, one typical casing program for a subsea oil and gas well, such as a well utilizing the mudline suspension system 100 illustrated in FIG. 1A, may use a 30" conductor casing, a 20" surface casing, a 14" intermediate casing, and a 10¾" production casing, which for shorthand purposes may be referred to herein as a 30-20-14-10¾ casing program. In such cases, the first casing hanger 122 will be a 30"×20" casing hanger, the second casing hanger 123 with be a 20"×14" casing hanger, and the third casing hanger 124 with be a 14"×10¾" casing hanger. The metal-to-metal sealing systems of the present disclosure may be used in conjunction with any or all of the casing hanger sizes listed for the 30-20-14-10¾ casing program noted above. Additionally, any of the metal-to-metal sealing systems disclosed herein may also be used in conjunction with other casing programs utilizing different size casing hangers, which by way of example only may include but not be limited to 36-26-16-12¾ casing programs, 30-20-13⅜-9⅞ casing programs, and the like.

Depending on the casing program requirements and overall target depth of the well, it should also be understood that any of the casing strings positioned inside of a conductor casing, such as the conductor casing 101, may have an overall configuration similar to, and contain any combination of the various illustrative subcomponents of, any of the casing strings 102, 103 and 104 illustrated in FIG. 1A and described above. Furthermore, casing string configurations other than those of the casing strings 101-104 specifically illustrated in FIG. 1A may also be used. Accordingly, it should also be understood that the illustrative nature of the casing strings 101-104 depicted in FIG. 1A should not be construed as being limiting in any way, as the metal-to-metal sealing systems disclosed herein may generally be used in conjunction with substantially any casing hanger and/or landing sub configuration without limitation.

Figure 1B:
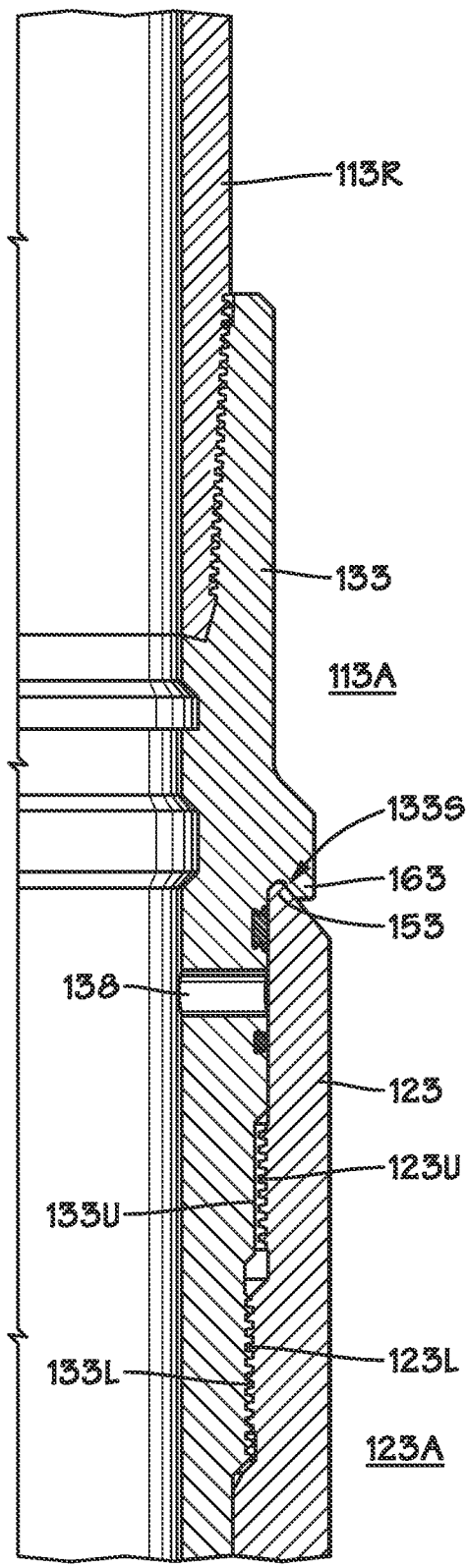
FIGS. 1B and 1C are cross-sectional views of an illustrative casing hanger and landing sub of FIG. 1A that utilize one embodiment of a metal-to-metal sealing system disclosed herein during various stages of disassembling the landing sub from the casing hanger.

FIG. 1B is a close-up cross-sectional view of the second casing hanger 123 and the mating intermediate casing landing sub 133 illustrated in FIG. 1A, showing some aspects of the components in further detail. As shown in FIG. 1B, the second casing hanger 123 and the intermediate casing landing sub 133 are in a fully assembled condition, wherein the metal-to-metal sealing system 133S has affected a pressure-tight seal between the nose 153 of the second casing hanger 123 and a corresponding sealing stub 163 on the intermediate casing landing sub 133. The configuration shown in FIG. 1B may be representative of a first sealing cycle between the second casing hanger 123 and the intermediate casing landing sub 133, as may typically be created during the initial assembly and testing of these components in the shop. In operation, the intermediate casing landing sub 133 may be attached to the second casing hanger 123 by threadably engaging the intermediate casing landing sub external threads 133L with the second casing hanger lower internal threads 123L, after which the intermediate casing landing sub 133 is run down onto the second casing hanger 123 until the metal-to-metal sealing system 133S is fully engaged and sealed. It should be appreciated that the landing subs 132, 134 may be similarly attached to respective first and third casing hangers 122, 124 in a substantially similar fashion using the landing sub external threads 132L, 134L to threadably engage first and third casing hanger lower internal threads 122L, 124L, respectively, so as to create the pressure-tight seals of the respective metal-to-metal sealing systems 132S and 134S, as illustrated in FIG. 1A.

As shown in FIG. 1B, in certain illustrative embodiments the second casing hanger 123 may also include second casing hanger upper internal threads 123U, which may be adapted to threadably engage a corresponding tieback sub during a subsequent tieback operation, such as the intermediate casing tieback sub 143 shown in FIGS. 3A-3C and discussed in further detail below. In such embodiments, the intermediate casing landing sub 133 may also have a corresponding recessed area 133U that is sufficiently recessed so that there is no engagement between the intermediate casing landing sub 133 and the second casing hanger upper internal threads 123U when the threaded connection is made up between the intermediate casing landing sub 133 and the second casing hanger 123.

In at least some embodiments, the intermediate casing landing sub 133 may also include a plurality of appropriately sized and positioned wash ports 138. In certain embodiments, the wash ports 138 may be used during a subsequent wash-out phase of the drilling operations to flush any loose materials and/or debris from the annular space 123A outside of the second casing hanger 123, as well as the annular space 113A outside of the intermediate casing landing sub 133 and the intermediate casing riser 113R, which, if left in place, may inadvertently damage the sealing surfaces of the metal-to-metal sealing system 133S and/or prevent a pressure-tight seal during subsequent abandonment and/or production phases. Additionally, the wash ports 138 may also be used to wash out any excess cement that may have inadvertently been pushed up into the annulus 123A and around the nose 153 of the second casing hanger 123, and/or into the annulus 113A during the cementing operation used to set the intermediate casing string 103, which can potentially prevent the later disengagement of the intermediate casing landing sub 133 prior to abandonment or tieback to a production platform. In other embodiments, one or both of the surface casing landing sub 132 and the production casing landing sub 134 may also include similarly adapted wash ports, such as the wash ports 137 and 139, respectively, shown in FIG. 1A.

Figure 1C:
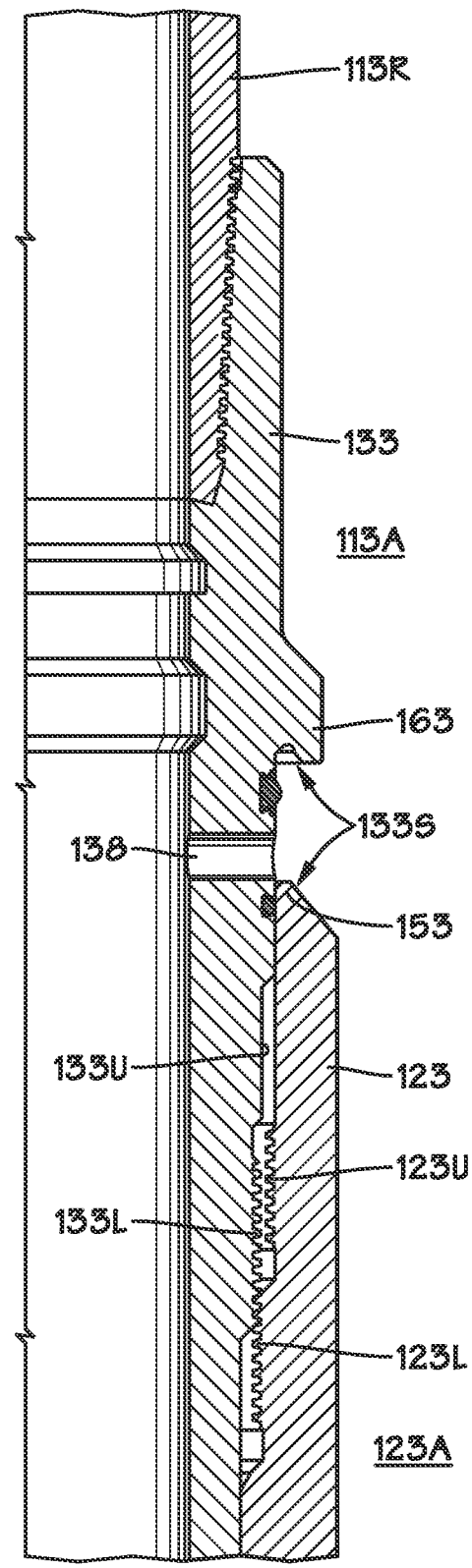

FIG. 1C depicts the cross-sectional view of the second casing hanger 123 and the mating intermediate casing landing sub 133 shown in FIG. 1B during the illustrative wash-out step described above. As shown in FIG. 1C, the metal-to-metal sealing system 133S has been disengaged and the associated pressure seal broken as the intermediate casing landing sub 133 has been threadably rotated relative to the second casing hanger 123 about the threads 133L, 123L so that the wash ports 138 are raised substantially clear of the nose 153 of the second casing hanger 123. Furthermore, in some embodiments, the wash ports 138 may be positioned on the intermediate casing landing sub 133 relative to the threads 133L, and the threads 123L may be positioned on the second casing hanger 123 relative to the nose 153, so that the threads 123L and 133L remain at least partially engaged when the wash ports 138 are raised to the position illustrated in FIG. 1C.

During the wash-out step, water may be pumped down the inside of the intermediate casing string 103, where it may exit through the wash ports 138 so as to flush and/or clean out the annular space 113A outside of the intermediate casing landing sub 133 and the intermediate casing riser 113R, as well as at least the portion of the annular space 123A around the nose 153 of second casing hanger 123. After completion of the wash-out step, the intermediate casing landing sub 133 may then be run down onto the second casing hanger 123 on the threads 133L, 123L until the metal-to-metal sealing system 133S is once again fully engaged, and a pressure-tight seal has again been established between the nose 153 and the sealing stub 163. FIG. 1B is also illustrative of the configuration at this stage, which may also be representative of a second sealing cycle between the second casing hanger 123 and the intermediate casing landing sub 133.

As noted previously, after all drilling, setting, and testing operations have been completed, the subsea well may then be abandoned for a period of time prior to the commencement of production activities. Prior to abandonment, each of the casing riser 102R, 103R and 104R must be removed by detaching each riser's associated land sub 132, 133 and 134 from its respective casing hanger 122, 123 and 124. FIG. 1C is further illustrative of this step relative to the detachment of the intermediate landing sub 133 from the second casing hanger 123, wherein metal-to-metal sealing system 133S is once again disengaged and the associated pressure seal broken. The intermediate casing landing sub 133 may be further threadably rotated relative to the second casing hanger 123 until the threads 133L and 123L are fully disengaged, after which the intermediate casing riser 113R with the intermediated casing landing sub 133 attached to the lower end thereof may be pulled away from the mudline suspension system 100 and raised to the drilling platform. Furthermore the surface casing riser 112R and the production casing riser 114R may be similarly threadably disengaged and raised.

As each casing riser is detached from the mudline suspension system 100 and raised to the surface, a temporary abandonment cap, or TA cap, is installed in its place prior to removing the next casing riser, so as to overall maintain pressure control on the subsea wellhead during the abandonment activities. Accordingly, the innermost casing riser, e.g., the production casing riser 114R as shown in FIG. 1A, is typically removed first, followed thereafter by each adjacent casing riser in succession, e.g., followed by the intermediate casing riser 113R, then by the surface casing riser 112R.

FIG. 2 is a cross-sectional view of the illustrative mudline suspension system 100 shown in FIG. 1A, after each of the landing subs 132, 133 and 134 and their associated riser casings 112R, 113R and 114R have been removed and replaced with respective TA caps 232, 233 and 234. In certain embodiments disclosed herein, each of the TA caps 232, 233 and 234 may be adapted to maintain pressure within those portions of the respective casing strings 102, 103 and 104 still remaining in the well. According, each of the TA caps 232, 233 and 234 may be installed so as to affect a pressure-tight seal against a respective casing hanger 122, 123 and 124 by using respective metal-to-metal sealing systems 232S, 233S, and 234S. FIG. 2 therefore illustrates a phase in the life cycle of the subsea well wherein a third sealing cycle has been imposed on each of the respective casing hangers 122, 123 and 124. The temporary abandonment caps 232, 233 and 234 may be maintained in place as shown in FIG. 2 until such time as the abandonment period ends, pre-production operations commence, and tieback subs are brought in to tie the subsea wellhead back to a subsea Christmas tree, a production platform, or other production facility, as will further discussed with respect to FIGS. 3A-3C below.

FIG. 3A shows the illustrative mudline suspension system 100 of FIG. 2 after the TA caps 232, 233 and 234 have been removed and tieback subs 142, 143 and 143 with associated casing risers 112R, 113R and 114R attached thereto have been landed on respective first, second and third casing hangers 122, 123 and 124. Furthermore, metal-to-metal sealing systems 142S, 143S and 144S in accordance with the present disclosure may be used to create pressure-tight seals between respective casing hangers 122, 123 and 124 and the corresponding tieback subs 142, 143 and 144. In certain illustrative embodiments, the TA caps 232-234 are removed in the reverse order of their installation, i.e, from the outermost TA cap 232 to the innermost TA cap 234, and a respective the tieback sub 142-144 with an associated casing riser 112R-114R is landed on a respective casing hanger 122-124 before the next successive TA cap is removed, thereby substantially maintaining pressure control over the subsea wellhead during tieback operations.

Accordingly, in the mudline suspension system 100 configuration shown in FIG. 3A, the surface casing string 102 is now made up of the surface casing 102, the first casing hanger 122, the surface casing tieback sub 142, and the surface casing riser 112R, and the intermediate casing string 103 is now made up of the intermediate casing 103, the second casing hanger 123, the expanding spring hanger 123X, the intermediate casing tieback sub 143, and the intermediate casing riser 113R. Additionally, the production casing string 104 is now made up of the production casing 104, the third casing hanger 124, expanding spring hanger 124X, the production casing tieback sub 144, and the production casing riser 114R.

Figure 3B:
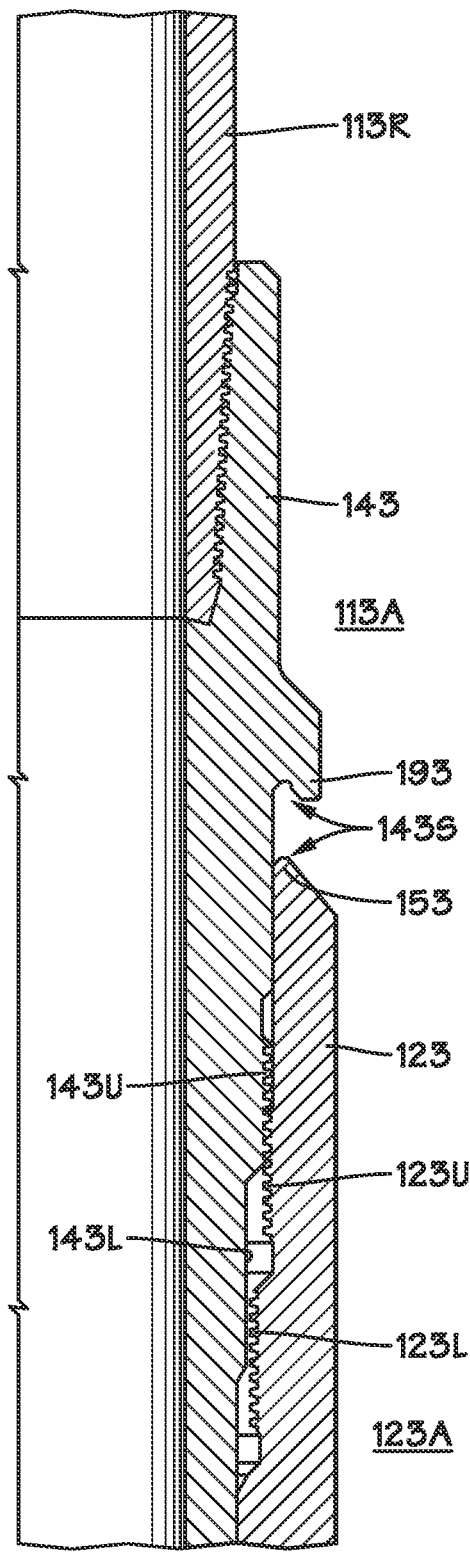
FIGS. 3B and 3C illustrate cross-sectional views of a casing hanger and tieback sub that utilize an illustrative embodiment of a metal-to-metal sealing system of the present disclosure during various steps of connecting the tieback sub to the casing hanger.

FIG. 3B is a close-up cross-sectional view of the second casing hanger 123 and the mating intermediate casing tieback sub 143 shown in FIG. 3A, further illustrating some aspects of these components in additional detail. As shown in FIG. 3B, the intermediate casing tieback sub 143 is in an early stage of being threadably connected to the second casing hanger 123, wherein the intermediate casing tieback sub external threads 143U have just been threadably engaged with the corresponding second casing hanger upper internal threads 123U, but wherein the metal-to-metal sealing system 143S has not yet been fully engaged. Accordingly, the metal sealing surface on the nose 153 of the second casing hanger 123 has not yet come into contact and created a seal with the metal sealing surface of the corresponding sealing stub 193 on the intermediate casing tieback sub 143. In some embodiments, the intermediate casing tieback sub 143 may also have a corresponding recessed area 143L that is sufficiently recessed so that there is no engagement between the intermediate casing tieback sub 143 and the second casing hanger lower internal threads 123L when the threaded connection is made up between the intermediate casing tieback sub 143 and the second casing hanger 123.

Figure 3C:
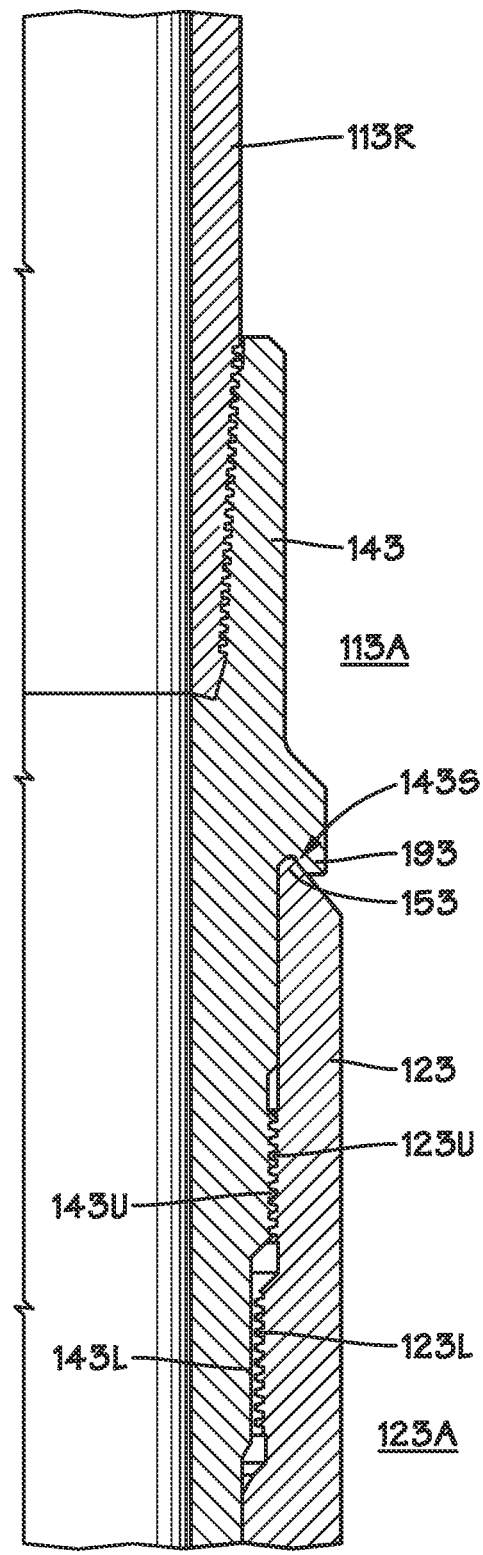

FIG. 3C depicts the cross-sectional view of the second casing hanger 123 and the mating intermediate casing tieback sub 143 of FIG. 3B after the intermediate casing tieback sub 143 has been landed and is in a fully assembled configuration with the second casing hanger 123. As shown in FIG. 3C, the metal-to-metal sealing system 143S has affected a pressure-tight seal between the nose 153 of the second casing hanger 123 and the corresponding sealing stub 193 on the intermediate casing tieback sub 143. In some embodiments, the configuration shown in FIG. 3C may be representative of a fourth sealing cycle that has been imposed on the nose 153 of the second casing hanger 123, i.e., after the first sealing cycle between the second casing hanger 123 and the intermediate casing landing sub 133 in the shop and the second cycle between those two components after the above described wash-out step.

In operation, full engagement of the intermediate casing tieback sub 143 with the second casing hanger 123 may be accomplished by threadably rotating the intermediate casing tieback sub 143 relative to the second casing hanger 123 about the threads 143U, 123U, during which time the intermediate casing tieback sub 143 is run down the second casing hanger 123 until the sealing stub 193 contacts the nose 153 so that metal-to-metal sealing system 143S is fully engaged and sealed. Furthermore, it should be appreciated that the tieback subs 142 and 144 illustrated in FIG. 3A may also be attached in similar fashion to respective first and third casing hangers 122, 124 in a substantially similar fashion using the tieback sub external threads 132U, 134U to threadably engage first and third casing hanger upper internal threads 122U, 124U, respectively, so as to create the pressure-tight seals of the respective metal-to-metal sealing systems 142S and 144S.

Additional details of the various illustrative metal-to-metal sealing systems disclosed herein will now be described in greater detail. For example, FIG. 4A is a cross-sectional close-up view of one such illustrative metal-to-metal sealing system 133S shown FIGS. 1A-1C during an early stage of assembling the intermediate casing landing sub 133 to the second casing hanger 123. As shown in FIG. 4A, the metal-to-metal sealing system 133S may be made up of a metal sealing surface 163L on an inside face of the sealing stub 163. In some embodiments, the sealing surface 163L may extend between a lower end 163E of the sealing stub 163 and a relief radius 163R that may be adapted to reduce local stresses in the intermediate casing landing sub 133 under the sealing loads imposed on the sealing stub 163 when the metal-to-metal sealing system 133S is fully engaged and sealed.

In certain embodiments of the present disclosure, the sealing surface 163L may be tapered at an angle 183B relative to the centerline axis 133C of the intermediate casing landing sub 133 (which, as noted above, may be substantially co-linear with, or at least substantially parallel to, the centerline axis 100C of the mudline suspension system 100 shown in FIGS. 1A, 2 and 3A), thereby defining a frustoconical sealing surface 163L. In at least some illustrative embodiments, the taper angle 183B of the frustoconical sealing surface 163L on the sealing stub 163 may be in the range of approximately 30-45°, whereas in certain embodiments the taper angle 183B may be approximately 40°, although it should be understood that other taper angles may also be used. In some embodiments, the frustoconical sealing surface 163L may have, for example, at least a 32 AARH surface finish, although other surface finishes may also be used depending on the specific design parameters for the metal-to-metal sealing system 133S, such as internal pressure and temperature requirements, taper angle, materials of construction, and the like.

The illustrative metal-to-metal sealing system 133S of FIG. 4A may also be made up of, among other things, a first lower metal sealing surface 153L that may be adapted to engage with and seal against the sealing surface 163L on the sealing stub 163. In some embodiments, the first lower sealing surface 153L may be positioned on an outside face of the nose 153 of the second casing hanger 123. Furthermore, a second upper metal sealing surface 153T may be positioned along the outside face of the nose 153 between the first lower sealing surface 153L and an upper end 153E of the nose 153, as shown in FIG. 4A. In certain illustrative embodiments, the second upper sealing surface 153T may be adapted to engage and seal against a corresponding metal sealing surface of a respective tieback sub during a later production tieback operation. See, e.g., the metal sealing surface 193T on the sealing stub 193 of the intermediate casing tieback sub 143 as shown in FIGS. 5A-5E, which will be described in further detail below. Accordingly, in at least some embodiments, the second upper sealing surface 153T may be immediately adjacent to the upper end 153E of the nose 153, whereas the first lower sealing surface 153L may be immediately adjacent to and below the second upper sealing surface 153T, i.e., separated from the upper end 153E of the nose 153 by the second upper sealing surface 153T. As with the previously-described frustoconical sealing surface 163L, the frustoconical sealing surfaces 153L and 153T may both have approximately a 32 AARH surface finish, although other surface finishes may also be used. Moreover, different surface finishes may be used for each of the respective frustoconical sealing surfaces 153L and 153T.

In certain embodiments, the first lower sealing surface 153L may also be tapered at an angle 173B relative to the centerline axis 123C of the second casing hanger 123 (which may also be substantially co-linear or substantially parallel to the centerline axis 100C), thereby defining a first lower frustoconical sealing surface 153L. Additionally, the taper angle 173B of the first lower frustoconical sealing surface 153L may be substantially the same as the taper angle 183B of the sealing surface 163L on the sealing stub 163 of the intermediate casing landing sub 133 so as to thereby substantially enable a pressure-tight seal upon engagement of the metal-to-metal sealing system 133S.

In some illustrative embodiments, the second upper sealing surface 153T may also be tapered at the angle 173B, i.e., substantially parallel to the first lower frustoconical sealing surface 153L, thereby also defining a second upper frustoconical sealing surface 153T. Furthermore, the second upper sealing surface 153T may be recessed along the tapered outside face of the nose 153 relative to the first lower frustoconical sealing surface 153L by a recess depth 153R. In at least some embodiments, the recess depth 153R may be adapted so that the sealing stub 163 on the intermediate casing landing sub 133 covers and substantially protects the second upper frustoconical sealing surface 153T during drilling operations, but wherein the frustoconical sealing surface 163L does not contact or sealingly engage the second upper frustoconical sealing surface 153T. In certain embodiments, the recess depth 153R may be on the order of approximately 8-15 one-thousandths of an inch (0.008"-0.015"), depending on various factors, including the size of the taper angles 173B, 183B, the desired amount of clearance between the frustoconical sealing surface 163L and the second upper frustoconical sealing surface 153T after full engagement of the metal-to-metal sealing system 133S, and the like. It should be appreciated, however, that other recess depths 153R may also be used.

The illustrative metal-to-metal sealing system 133S of FIG. 4A may also include a contact stop surface 163S on the sealing stub 163 that is inboard of the relief radius 163R, i.e., wherein it is closer to the centerline axis 133C of the intermediate casing landing sub 133 than the relief radius 163R. In some embodiments, the contact stop surface 163S is adapted to come into contact with a corresponding contact stop surface 153S that is adjacent to the end 153E of the nose 153 as the intermediate casing landing sub 133 is being attached to the second casing hanger 123. Furthermore, the contact stop surfaces 163S and 153S may be positioned relative to the respective corresponding frustoconical sealing surfaces 163L and 153L so that when the contact stop surfaces 163S and 153S are in contact, they may substantially prevent an over-tightening condition of the metal-to-metal sealing system 133S, thereby potentially avoiding any subsequent damage to the frustoconical sealing surfaces 163L and 153L.

In some embodiments of the present disclosure, the contact stop surface 163S may be tapered at an angle 183A relative to the centerline axis 133C of the intermediate casing landing sub 133 and the contact stop surface 153S may be tapered at an angle 173A relative to the centerline axis 123C of the second casing hanger 123, as shown in FIG. 4A. Accordingly, the contact stop surfaces 153S and 163S may substantially define respective frustoconical surfaces. In certain exemplary embodiments, the taper angle 183A may be substantially the same as the taper angle 173A, thereby allowing the two frustoconical contact stop surfaces to 153S, 163S to reliably stop the axial movement of the intermediate casing landing sub 133 relative to the second casing hanger 123 when the two frustoconical contact stop surfaces 153S, 163S come into contact as the metal-to-metal sealing system 133S is being engaged and sealed.

Depending on the overall design parameters of the intermediate casing landing sub 133 and the second casing hanger 123, the taper angles 173A, 183A may be in the range of approximately 40-60°, whereas in certain embodiments, other angles may also be used. However, in at least some embodiments, the taper angles 173A, 183A of the respective contact frustoconical stop surfaces 153S, 163S may be greater than the corresponding taper angles 173B, 183B of the respective frustoconical sealing surfaces 153L, 163L. In this way, a greater percentage of the axial load created by the engagement of the intermediate casing landing sub external threads 133L with the second casing hanger lower internal threads 123L (see, FIGS. 1B-1C) during the attachment of the intermediate casing landing sub 133 to the second casing hanger 123 will be taken by the mating frustoconical contact stop surfaces 153S, 163S, rather than by the mating frustoconical sealing surfaces 153L, 163L, thereby potential avoiding undue damage to the frustoconical sealing surfaces 153L, 163L. Accordingly, in certain embodiments, e.g., wherein the taper angles 173B, 183B of the frustoconical sealing surfaces 153L, 163L may be approximately 40°, the taper angles 173A, 183A of the frustoconical contact stop surfaces frustoconical 153S, 163S may be approximately 50°, i.e., greater than the taper angles 173B, 183B. It should be appreciated, however, that other specific taper angles may also be used.

FIG. 4B is a cross-sectional view of the metal-to-metal sealing system 133S of FIG. 4A in a further advanced stage of assembling the intermediate casing landing sub 133 to the second casing hanger 123, and FIG. 4C is a blow-up view of some detailed aspects of the metal-to-metal sealing system 133S shown in FIG. 4B. In the assembly stage depicted in FIGS. 4B and 4C, the intermediate casing landing sub 133 has been threaded onto the second casing hanger 123 to a point where the frustoconical sealing surface 163L has been brought into initial contact with the mating first lower frustoconical sealing surface 153L. Additionally, in certain embodiments, while the frustoconical sealing surfaces 153L, 163L are in the initial contact configuration, the frustoconical sealing surface 163L may be separated from the second upper frustoconical sealing surface 153T by a gap 133G, the size of which may be substantially the same as the recess depth 153R shown in FIG. 4A. Accordingly, as shown in FIG. 4B, a portion of the frustoconical sealing surface 163L may extend over and cover at least a portion of the second upper frustoconical sealing surface 153T. Furthermore, the sealing stub 163, together with the pressure-tight seal that is eventually affected between the frustoconical sealing surface 163L and the first lower frustoconical sealing surface 153L, may act to therefore substantially protect the second upper frustoconical sealing surface 153T from any debris, cement, and/or other materials that may be present in one or both of the annular spaces 123A, 113A during drilling operations.

In some illustrative embodiments, when the frustoconical sealing surfaces 163L and 153L are brought into initial contact, the frustoconical contact stop surfaces 163S and 153S may not yet be in contact. More specifically, during this stage of engaging the metal-to-metal sealing system 133S, the frustoconical contact stop surface 163S on the intermediate casing landing sub 133 may be separated from the frustoconical contact stop surface 153S on the nose 153 of the second casing hanger 123 by a gap 163G, as shown in FIGS. 4B and 4C. The size of the gap 163G may vary, depending on the requisite closure design parameters, such as the relative sizes of the taper angles 173A, 183A and 173B, 183B, the relative diameters of the frustoconical sealing surfaces 153L, 163L, the amount of compressive deformation required in the sealing surfaces 153L, 163L during full engagement of the metal-to-metal sealing system 133S, and the like. For example, in certain embodiments, the gap 163G may be on the order of approximately 0.008"-0.012", although other gap sizes may also be used.

Figure 4D:
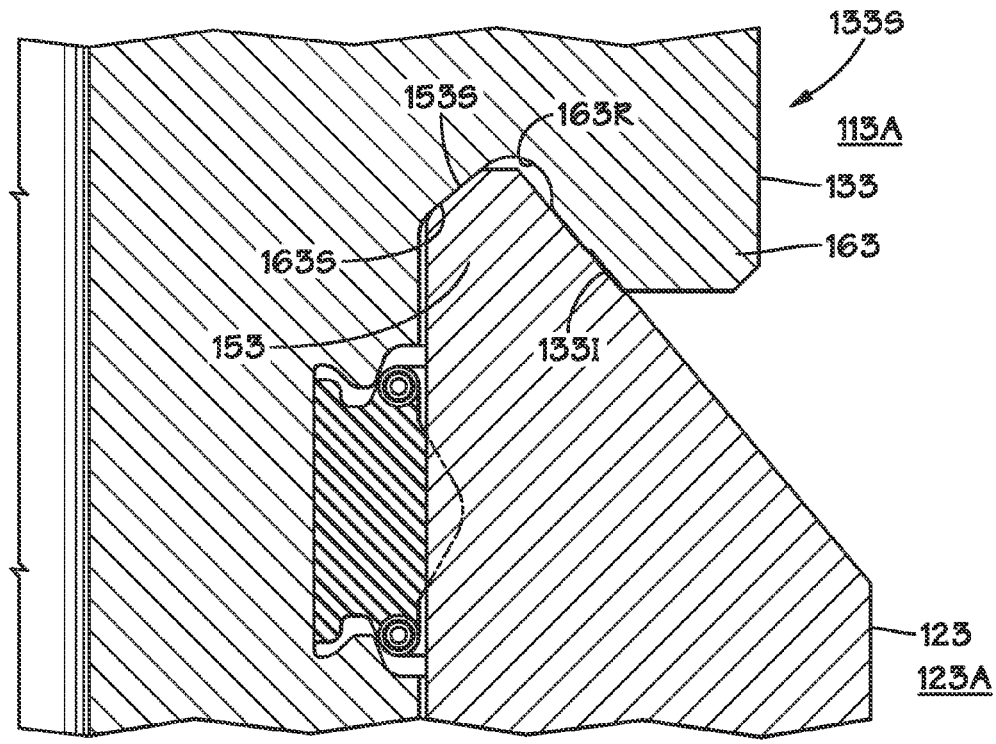
Figure 4E:
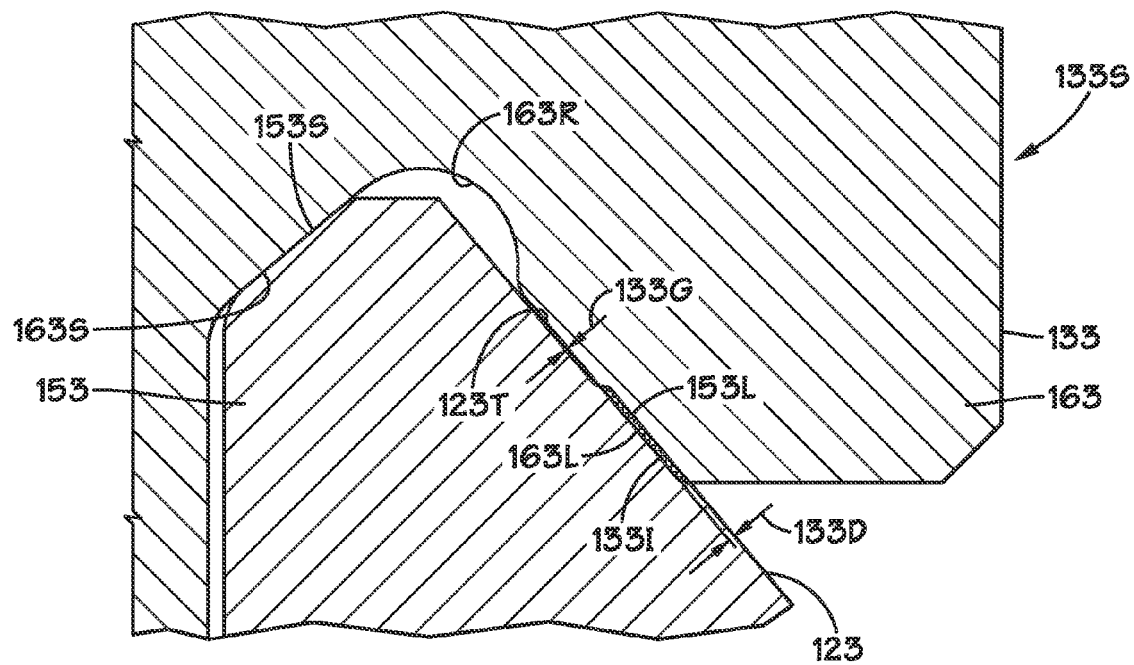

FIG. 4D is a cross-sectional view of the metal-to-metal sealing system 133S of FIGS. 4A-4C in a further advanced stage of assembly, and FIG. 4E is a blow-up view showing some detailed aspects of the metal-to-metal sealing system 133S illustrated in FIG. 4D. As shown in FIGS. 4D and 4E, the frustoconical contact stop surface 163S on the intermediate casing landing sub 133 has been brought into stop contact with the mating frustoconical contact stop surface 153S on the nose 153 of the second casing hanger 123. Furthermore, some amount of compressive interference my occur between the materials near the surfaces of the mating frustoconical sealing surfaces 153L and 163L, indicated by reference number 133I. In some illustrative embodiments, the metal-to-metal sealing system 133S may be adapted so that the total amount of compressive interference, as indicated by the depth 133D shown in FIG. 4E, substantially remains within the elastic stress limits of the materials making up the intermediate casing landing sub 133 and the second casing hanger 123. For example, in certain embodiments, the total amount of compressive interference 133I may range from approximately 0.005"-0.011". The illustrative metal-to-metal sealing system 133S may also be designed for other amounts of compressive interference depending on various parameters, such as the specific materials of construction, the anticipated sealing loads, and the like.

Also as shown in FIG. 4E, the size of the gap 133G between the frustoconical sealing surface 163L on the sealing stub 163 and the second upper frustoconical sealing surface 153T on the nose 153 may be reduced during the full sealing engagement of the metal-to-metal sealing system 133S. In some embodiments, the gap 133G may be reduced from its initial size—e.g., substantially the same as the recess depth 153R—by at least a portion of the amount 133D of compressive interference 133I. For example, in some embodiments, the gap 133G may range from approximately 0.002"-0.005" after full sealing engagement of the metal-to-metal sealing system 133S, although other final gap sizes may also be used.

Depending on the specific application, various different materials of construction well known in the art may be used for the components of the illustrative metal-to-metal sealing system 133S shown in FIGS. 4A-4E and described above. By way of example only, in certain HPHT applications—e.g., wherein the pressure is 10,000 psi or greater and the temperature is 250° F. or higher—the second casing hanger 123 and the mating intermediate casing landing sub 133 may be made up of a high-nickel alloy having high-strength material properties, such as Alloy 945, Alloy 718, and the like, although other materials suitable for HPHT service may also be used. In other embodiments, such as for those applications wherein high temperature strength may not be required but a metal-to-metal seal is still desired, low alloy materials such as AISI 4130, AISI 4140, AISI 4130 Modified, and the like, may also be used. In still further embodiments, either of the second casing hanger 123 and the intermediate casing landing sub 133 may be made up of a high-nickel alloy as noted above, whereas the other of the two components may be made up of a low alloy material. For example, in certain embodiments, the second casing hanger 123—which generally remains as a more permanent component of the mudline suspension system 100—may be made of a suitable HPHT high-nickel alloy material. On the other hand, if long-term high temperature operation is not a significant design consideration, the intermediated casing landing sub 133—which is generally only a temporary component that is removed after the drilling operations—may be made of a suitable high-strength low alloy material. Of course, it should be appreciated that the materials of construction used for all components may be adjusted as required for the specific requirements of the subsea oil and gas well in question.

It should be understood that assembly sequence of the illustrative metal-to-metal sealing system 133S depicted in FIGS. 4A-4E may be representative of any applicable sealing and/or re-sealing sequence between the second casing hanger 123 and a corresponding mating component that is brought into sealing contact with the first lower frustoconical sealing surface 153L on the nose 153. For example, FIGS. 4A-4E may be illustrative of a first sealing cycle when the metal-to-metal sealing system 133S is fully engaged and sealed by threadably connecting the intermediate casing landing sub 133 to the second casing hanger 123 for the first time in the shop. FIGS. 4A-4E may also be illustrative of a second sealing cycle wherein the intermediate casing landing sub 133 is threadably connected to the second casing hanger 123 and the metal-to-metal sealing system 133S is fully engaged and sealed for the second time after a washout step during drilling operations. FIGS. 4A-4E may be further illustrative of yet a third sealing cycle when the intermediate casing TA cap 233 is threadably connected to the second casing hanger 123 and the metal-to-metal sealing system 233S (see, FIG. 2) is fully engaged and sealed after the intermediate casing riser 113R and intermediate riser landing sub 133 have been removed from the mudline suspension system 100 in preparation for temporary abandonment. In each case described above, the first lower frustoconical sealing surface 153L on the second casing hanger 123 is sealingly engaged by the corresponding frustoconical sealing surface on the respective mating component (e.g., the intermediate casing landing sub 133 and/or the intermediate casing TA cap 233). Furthermore, in each case the upper second frustoconical sealing surface 153T is also at least partially covered and substantially protected by the respective mating component 133 and or 233.

As may be appreciated by those of ordinary skill, material galling effects can sometimes be a significant design consideration when utilizing a metal-to-metal sealing configuration wherein one high-nickel alloy material is in direct contact with another high-nickel alloy material under high loading conditions. Accordingly, in certain illustrative embodiments of the present disclosure wherein both the intermediate casing landing sub 133 and the second casing hanger 123 are made up of high-nickel alloy materials, a suitable plating or coating material that is adapted to reduce the detrimental effects of galling may be deposited on one or both of the frustoconical sealing surfaces 153L and 163L. For example, in some embodiments, a thin metal film, such as silver or a silver/palladium alloy, having a thickness in the range of approximately 0.0002" (two ten-thousandths of an inch) to 0.002" may be electrochemically deposited on one or both of the frustoconical sealing surfaces 153L and 163L. Other thin metal films and/or thicknesses may also be used.

Figure 5B:
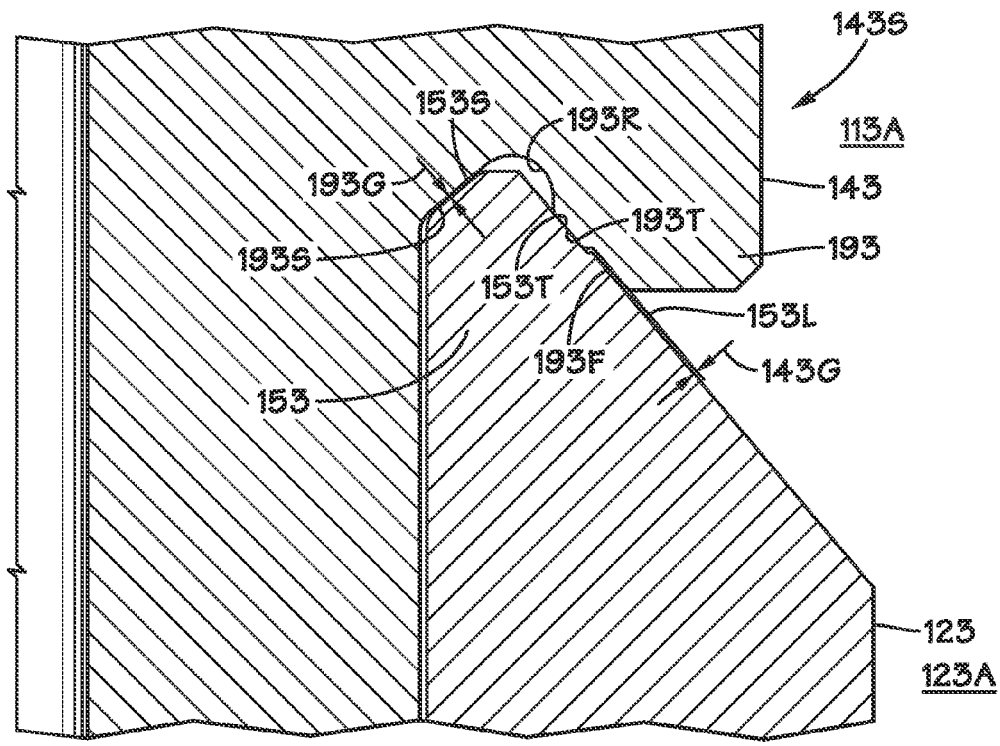

FIGS. 5A-5E depict various close-up cross-sectional views of other illustrative aspects of the metal-to-metal sealing systems disclosed herein. More specifically, FIG. 5A is a close-up cross-sectional view of the metal-to-metal sealing system 143S shown FIGS. 3A-3C during an early stage of assembling the intermediate casing tieback sub 143 to the second casing hanger 123. As shown in FIG. 5A, the metal-to-metal sealing system 143S is made up of at least some elements from the metal-to-metal sealing system 133S illustrated in FIGS. 4A-4E and described above. More specifically, the metal-to-metal sealing system 143S utilizes the various elements on the nose 153 of the second casing hanger 123, including the first lower frustoconical sealing surface 153L, the second upper frustoconical sealing surface 153T, and the frustoconical contact stop surface 153S, which are arranged on the nose 153 in the configuration and relative positions as previously described with respect to the metal-to-metal sealing system 133S shown in FIGS. 4A-4E. The second upper frustoconical sealing surface 153T may have a taper angle 173C, which, in at least some illustrative embodiments, may be substantially the same as the taper angle 173B of the first lower frustoconical sealing surface 153L. It should be appreciated, however, that it is within the scope and spirit of the present disclosure for the second upper frustoconical sealing surface 153T to be tapered at a substantially different taper angle than that of the first lower frustoconical sealing surface 153L, and accordingly all such embodiments are also included herein.

The metal-to-metal sealing system 143S may also be made up of a frustoconical metal sealing surface 193T that is disposed on an inside face of the sealing stub 193. Unlike the frustoconical sealing surface 163L on the intermediate casing landing sub 163, the frustoconical sealing surface 193T is adapted to engage with and seal against the second upper frustoconical sealing surface 153T on the nose 153. Accordingly, while the first lower frustoconical sealing surface 153L on the second casing hanger 123 may be sealingly engaged multiple times during drilling operations and the abandonment stage, the recessed configuration of the second upper frustoconical sealing surface 153T may not be sealingly engaged by a corresponding metal sealing surface, e.g., the frustoconical sealing surface 193T, until the intermediate casing tieback sub 143 is landed on and threadably engaged with the second casing hanger 123. In this way, the substantially clean and previously unused second upper frustoconical sealing surface 153T—which may have been substantially protected by the sealing stub 163 on the intermediate casing landing sub 133 (or a corresponding component of the TA sub 233)—may be available for use with the metal-to-metal sealing system 143S.

As shown in FIG. 5A, the frustoconical sealing surface 193T may be tapered at an angle 193C relative to the centerline axis 143C of the intermediate casing tieback sub 143, which may be substantially co-linear with, or at least substantially parallel to, the centerline axis of the mudline suspension system 100 (see FIGS. 1A, 2 and 3A). In certain embodiments, the taper angle 193C of the frustoconical sealing surface 193T on the sealing stub 193 of the intermediate casing tieback sub 143 may be substantially the same as the taper angle 173C of the second frustoconical sealing surface 153T so as to thereby substantially enable a pressure-tight seal upon engagement of the metal-to-metal sealing system 143S.

In at least some illustrative embodiments, the taper angle 193C of the frustoconical sealing surface 193T on the sealing stub 193 may be in the range of approximately 30-45°, whereas in certain embodiments the taper angle 193C may be approximately 40°. As with the frustoconical sealing surface 163L on the intermediate casing landing sub 133 above, the frustoconical sealing surface 193T may, in some embodiments, have approximately a 32 AARH surface finish, although other surface finishes may also be used depending on the specific design parameters for the metal-to-metal sealing system 143S, such as internal pressure and temperature requirements, taper angle, materials of construction, and the like.

The frustoconical sealing surface 193T may be positioned between a lower end 193E of the sealing stub 193 and a relief radius 193R that may be adapted to reduce local stresses in the intermediate casing tieback sub 143 under the sealing loads that are imposed on the sealing stub 193 when the metal-to-metal sealing system 143S is fully engaged and sealed. In certain embodiments, the intermediate casing tieback sub 143 may also include a frustoconical surface portion 193F that is positioned along the inside face of the sealing stub 193 between the frustoconical sealing surface 193T and lower end 193E of the sealing stub 193, as shown in FIG. 5A. Accordingly, in at least some embodiments, the frustoconical surface portion 193F may be immediately adjacent to the lower end 193E of the sealing stub 193, whereas the frustoconical sealing surface 193T may be immediately adjacent to and below the second upper sealing surface 153T, i.e., separated from the lower end 193E of the sealing stub 193 by the frustoconical surface portion 193F.

In some illustrative embodiments, frustoconical surface portion 193F may also be tapered at the angle 193C, i.e., substantially parallel to the frustoconical sealing surface 193T. Furthermore, the frustoconical surface portion 193F may be recessed along the tapered inside face of the sealing stub 193 relative to the frustoconical sealing surface 193T by a recess depth 193H. In at least some embodiments, the recess depth 193H may be adapted so that the recessed frustoconical surface portion 193F does not contact the first lower frustoconical sealing surface 153L on the nose 153 and interfere with the sealing contact between the frustoconical sealing surface 193T on the sealing stub 193 and the second upper frustoconical sealing surface 153T during engagement of the metal-to-metal sealing system 143S. In certain embodiments, the recess depth 193H may be in the range of approximately 0.015"-0.020"), depending on various factors, including the size of the taper angles 173C, 193C, the desired amount of clearance between the recessed frustoconical surface portion 193F and the first lower frustoconical sealing surface 153L after full engagement of the metal-to-metal sealing system 143S, and the like. It should be appreciated, however, that other recess depths 193H may also be used.

The illustrative metal-to-metal sealing system 143S of FIG. 5A may also include a contact stop surface 193S on the sealing stub 193 that is inboard of the relief radius 193R. In some embodiments, the contact stop surface 193S is adapted to come into contact with the corresponding contact stop surface 153S on the nose 153 as the intermediate casing tieback sub 143 is being landed on and attached to the second casing hanger 123. Furthermore, as described with respect to FIG. 4A above, the contact stop surfaces 193S and 153S may be positioned relative to the respective corresponding frustoconical sealing surfaces 193T and 153T so as to substantially prevent an over-tightening condition of the metal-to-metal sealing system 143S, thereby reducing the likelihood of damaging to the frustoconical sealing surfaces 193T and 153T during sealing engagement.

In some embodiments, the contact stop surface 193S may be tapered at an angle 193A relative to the centerline axis 143C of the intermediate casing tieback sub 143. Additionally, the taper angle 193A may be substantially the same as the taper angle 173A, thereby allowing the two contact stop surfaces to 153S, 193S to reliably stop the axial movement of the intermediate casing tieback sub 143 relative to the second casing hanger 123 when the two contact stop surfaces 153S, 193S come into contact as the metal-to-metal sealing system 143S is being engaged and sealed. Accordingly, as with the angle 183A of the contact stop surface 163S on the intermediate casing landing sub 133, in at least some illustrative embodiments the taper angle 193A may be in the range of approximately 40-60°, whereas in certain embodiments the taper and 193A may be approximately 50°. However, other specific taper angles may also be used.

Figure 5C:
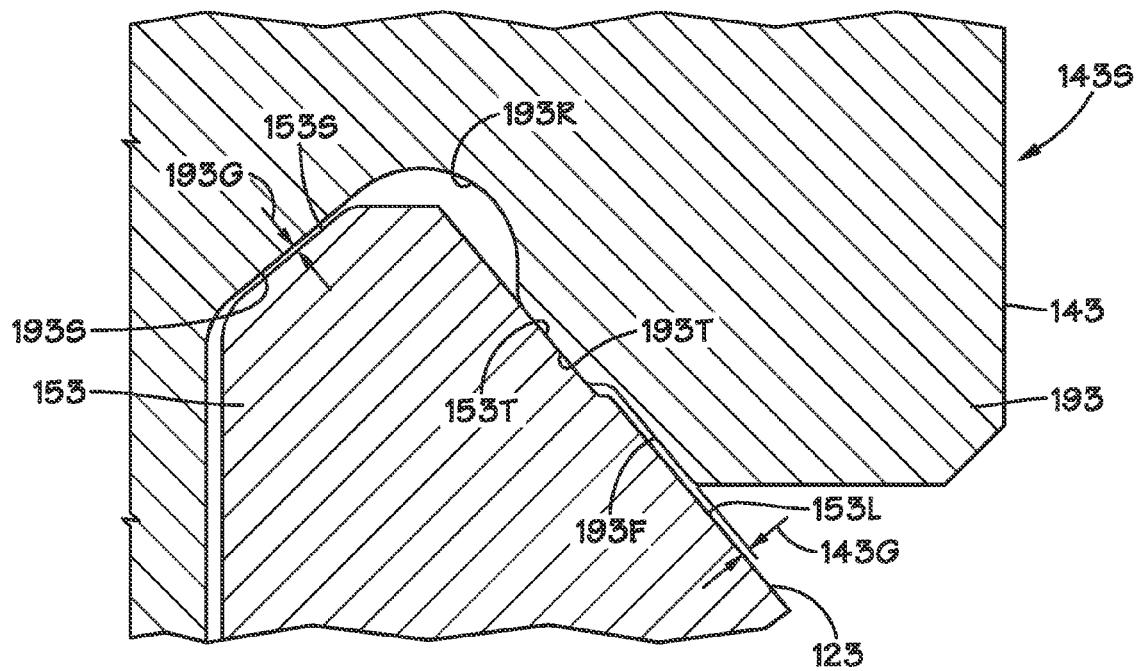

FIG. 5B is a cross-sectional view of the metal-to-metal sealing system 143S of FIG. 5A during a later stage of connecting the intermediate casing tieback sub 143 to the second casing hanger 123, and FIG. 5C is a blow-up view showing some detailed aspects of the metal-to-metal sealing system 143S shown in FIG. 5B. In the assembly stage shown in FIGS. 5B and 5C, the intermediate casing tieback sub 143 has been threaded onto the second casing hanger 123 to a point where the frustoconical sealing surface 193T has been brought into initial contact with the mating second upper frustoconical sealing surface 153T. Additionally, in certain embodiments, while the frustoconical sealing surfaces 153T, 193T are in the initial contact configuration, the frustoconical surface portion 193F of the sealing stub may be separated from the first lower frustoconical sealing surface 153L by a gap 143G, the size of which may be substantially equal to recess depth 193H less the recess depth 153R shown in FIG. 5A. For example, in at least some embodiments, the gap 143G may be in the range of approximately 0.007"-0.010". It should be appreciated, however, that other gap sizes 143G may also be used, provided there may ultimately be sufficient clearance between the frustoconical surface portion 193F and the first lower frustoconical sealing surface 153L during full sealing engagement of the metal-to-metal sealing system 143S—i.e., so that the frustoconical surface portion 193F does not come into contact with the first lower frustoconical sealing surface 153L In certain illustrative embodiments, when the frustoconical sealing surfaces 193T and 153T are brought into initial contact, the contact stop surfaces 193S and 153S may not yet be in contact. More specifically, during this stage of engaging the metal-to-metal sealing system 143S, the contact stop surface 193S on the intermediate casing tieback sub 143 may be separated from the contact stop surface 153S on the nose 153 of the second casing hanger 123 by a gap 193G, as shown in FIGS. 5B and 5C. The size of the gap 193G may vary, depending on the requisite closure design parameters, such as those previously discussed above with respect to the gap 163G associated with the assembly of the intermediate casing landing sub 133 and the second casing hanger 123. For example, in certain embodiments, the gap 193G may be on the order of approximately 0.005"-0.010", although other gap sizes may also be used.

FIG. 5D is a cross-sectional view of the metal-to-metal sealing system 143S of FIGS. 5A-5C in a further advanced stage of assembly, and FIG. 5E is a blow-up view of some detailed aspects of the metal-to-metal sealing system 143S illustrated in FIG. 5D. As shown in FIGS. 5D and 5E, the contact stop surface 193S on the intermediate casing tieback sub 143 has been brought into stop contact with the mating contact stop surface 153S on the nose 153 of the second casing hanger 123. Furthermore, in certain embodiments, some amount of compressive interference my occur between the mating frustoconical sealing surfaces 153T and 193T, indicated by reference number 143I. As previously described with respect to the metal-to-metal sealing system 133S, the metal-to-metal sealing system 143S may be adapted so that the total amount of compressive interference, as indicated by the depth 143D shown in FIG. 5E, substantially remains within the elastic stress limits of the materials of construction of the intermediate casing tieback sub 143 and the second casing hanger 123. For example, in some embodiments, the total amount of compressive interference 133I may range from approximately 0.005"-0.010". The illustrative metal-to-metal sealing system 143S may also be designed for other amounts of compressive interference depending parameters such as the specific materials of construction, the anticipated sealing loads, and the like.

Also as shown in FIG. 5E, the size of the gap 143G between the frustoconical surface portion 193F on the sealing stub 193 and the first lower frustoconical sealing surface 153L on the nose 153 may be reduced during the full sealing engagement of the metal-to-metal sealing system 143S. In some embodiments, the gap 143G may be reduced from its initial size by at least a portion of the amount 143D of compressive interference 143I. For example, in certain embodiments, the gap 143G may range from approximately 0.002"-0.009" after full sealing system engagement, although other final gap sizes may also be used.

It should be appreciated that, in at least some illustrative embodiments, an end portion 193N of the sealing stub 193, which may include the entirety of the frustoconical surface portion 193F, may not be included as part of the intermediate casing tieback sub 143. Accordingly, in such embodiments, the frustoconical surface portion 193F will not be present, and therefore will not form a gap 143G with the first lower frustoconical sealing surface 153L, and the frustoconical sealing surface 193T will be immediately adjacent to the optional end 193E' of the sealing stub 193. See, e.g., FIGS. 5D and 5C.

Depending on the specific application, the material of the intermediate casing tieback sub 143 may be any of the materials previously described with respect to the intermediate casing landing sub 133 above, e.g., a high-nickel alloy material, a low alloy material, and the like. Furthermore, in those illustrative embodiments wherein galling may potentially occur between mating surfaces, such as when the material of construction of the intermediate casing tieback sub 143 may be a high-nickel alloy, a thin metal film that is adapted to reducing material galling effects may be deposited on the frustoconical sealing surface 193T.

It should be understood that the specific descriptions set forth herein of the metal-to-metal systems 133S and 143S are exemplary only, and the details associated with the configurations illustrated in FIGS. 4A-4E and FIGS. 5A-5E may be equally applicable to any or all of the metal-to-metal sealing systems 132S-134S, 232S-234S, and 142S-144S shown in FIG. 1A, FIG. 2 and FIG. 3A, respectively.

As a result of the above-described subject matter, various metal-to-metal sealing systems, such as for casing hanger connections and the like, and methods for assembling the same are disclosed, which may improve seal reliability in mudline suspension systems.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A system, comprising:
    a first pressure-retaining component having a first end, said first pressure-retaining component comprising:
        a first contact stop surface proximate said first end and positioned on an inside face of said first pressure-retaining component; and
        first and second metal sealing surfaces proximate said first end and positioned on an outside face of said first pressure-retaining component, wherein said second metal sealing surface is positioned along said outside face between said first metal sealing surface and said first end of said first pressure-retaining component; and
    a second pressure-retaining component having a second end that is adapted to be removably attached to said first end of said first pressure-retaining component, said second pressure-retaining component comprising:
        a second contact stop surface; and
        a third metal sealing surface proximate said second end and positioned on an inside face of said second pressure-retaining component, wherein said third metal sealing surface is adapted to sealingly engage at least said first metal sealing surface and wherein said second contact stop surface is adapted to contact said first contact stop surface as said third metal sealing surface sealingly engages said first metal sealing surface.

2. The system of claim 1, wherein said outside face comprises first and second outside face portions, said first outside face portion comprising said first metal sealing surface and said second outside face portion comprising said second metal sealing surface.

3. The system of claim 2, wherein said second metal sealing surface of said second outside face portion is recessed along said outside face relative to said first metal sealing surface of said first outside face portion.

4. The system of claim 3, wherein said second and third metal sealing surfaces define a first gap therebetween when said third metal sealing surface is sealingly engaged with said first metal sealing surface.

5. The system of claim 3, wherein said first metal sealing surface of said first outside face portion comprises a first frustoconical sealing surface having a first taper angle, said second metal sealing surface of said second outside face portion comprises a second frustoconical sealing surface having a second taper angle, and said third metal sealing surface of said inside face of said second pressure-retaining component comprises a third frustoconical sealing surface having a third taper angle.

6. The system of claim 5, wherein said third taper angle is substantially the same as said first taper angle.

7. The system of claim 5, wherein said second taper angle is substantially the same as said first taper angle.

8. The system of claim 1, wherein said first contact stop surface comprises a first frustoconical contact stop surface having a first contact stop taper angle and said second contact stop surface comprises a second frustoconical contact stop surface having a second contact stop taper angle.

9. The system of claim 8, wherein said second contact stop taper angle is substantially the same as said first contact stop taper angle.

10. The system of claim 1, further comprising a third pressure-retaining component having a third end that is adapted to be attached to said first end of said first pressure-retaining component after said second pressure-retaining component has been detached from said first end of said first pressure-retaining component, said third pressure-retaining component comprising an inside face proximate said third end thereof, wherein said inside face of said third pressure-retaining component comprises a fourth metal sealing surface that is adapted to sealingly engage at least said second metal sealing surface when said third end of said third pressure-retaining component is attached to said first end of said first pressure-retaining component.

11. The system of claim 10, wherein said inside face of said third pressure-retaining component comprises first and second inside face portions, said second inside face portion being positioned between said first inside face portion and said third end of said third pressure-retaining component, said first inside face portion comprising said fourth metal sealing surface, and said second inside face portion being recessed relative to said fourth metal sealing surface of said first inside face portion.

12. The system of claim 11, wherein said second inside surface portion and said first metal sealing surface define a second gap therebetween when said fourth metal sealing surface is sealingly engaged with said second metal sealing surface.

13. The system of claim 11, wherein said first metal sealing surface of said first outside face portion comprises a first frustoconical sealing surface having a first taper angle, said second metal sealing surface of said second outside face portion comprises a second frustoconical sealing surface having a second taper angle, and said fourth metal sealing surface of said inside face of said second pressure-retaining component comprises a fourth frustoconical sealing surface having a fourth taper angle.

14. The system of claim 13, wherein said fourth taper angle is substantially the same as said first taper angle.

15. The system of claim 10, wherein said third pressure-retaining component further comprises a third contact stop surface that is adapted to contact said first contact stop surface as said fourth metal sealing surface sealingly engages said second metal sealing surface.

16. The system of claim 15, wherein said first contact stop surface comprises a first frustoconical contact stop surface having a first contact stop taper angle and said third contact stop surface comprises a third frustoconical contact stop surface having a third contact stop taper angle.

17. The system of claim 16, wherein said third contact stop taper angle is substantially the same as said first contact stop taper angle.

18. The system of claim 1, wherein said inside face of said first pressure-retaining component is a tapered surface that angles away from said first end and toward a centerline of said first pressure-retaining component, and wherein said outside face of said first pressure-retaining component is a tapered surface that angles away from said first end and away from said centerline.

19. The system of claim 1, wherein said first contact stop surface is spaced apart and separate from said first and second metal sealing surfaces.

20. A system, comprising:
a first pressure-retaining component comprising first and second frustoconical metal sealing surfaces proximate a first end of said first pressure-retaining component and on an outside face thereof, wherein said second frustoconical metal sealing surface is positioned along said outside face between said first frustoconical metal sealing surface and said first end of said first pressure-retaining component;
a second pressure-retaining component having a second end that is adapted to be removably attached to said first end of said first pressure-retaining component, said second pressure-retaining component comprising a third frustoconical metal sealing surface proximate said second end of said second pressure-retaining component and on an inside face thereof, wherein said second pressure-retaining component is adapted to cover but not contact said second frustoconical metal sealing surface and said third frustoconical metal sealing surface is adapted to sealingly engage at least said first frustoconical metal sealing surface when said second end of said second pressure-retaining component is removably attached to said first end of said first pressure-retaining component; and
a third pressure-retaining component having a third end that is adapted to be attached to said first end of said first pressure-retaining component after said second pressure-retaining component has been detached from said first end of said first pressure-retaining component, said third pressure-retaining component comprising a fourth frustoconical metal sealing surface proximate said third end of said third pressure-retaining component and on an inside face thereof, wherein said fourth frustoconical metal sealing surface is adapted to sealingly engage at least said second frustoconical metal sealing surface when said third end of said third pressure-retaining component is attached to said first end of said first pressure-retaining component.

21. The system of claim 20, wherein said second frustoconical metal sealing surface is recessed along said outside face of said first pressure-retaining component relative to said first frustoconical metal sealing surface.

22. The system of claim 21, wherein said second and third frustoconical metal sealing surfaces define a first gap therebetween when said third frustoconical metal sealing surface is sealingly engaged with said first frustoconical metal sealing surface.

23. The system of claim 20, wherein a taper angle of said second frustoconical metal sealing surface is substantially the same as a taper angle of said first frustoconical metal sealing surface.

24. The system of claim 20, wherein a taper angle of said third frustoconical metal sealing surface is substantially the same as a taper angle of said first frustoconical metal sealing surface.

25. The system of claim 20, wherein a taper angle of said fourth frustoconical metal sealing surface is substantially the same as a taper angle of said second frustoconical metal sealing surface.

26. The system of claim 20, wherein said third pressure-retaining component further comprises a recessed frustoconical surface portion on said inside face thereof, wherein said recessed frustoconical surface portion is recessed relative to said fourth frustoconical metal sealing surface.

27. The system of claim 26, wherein said recessed frustoconical surface portion and said first frustoconical metal sealing surface define a second gap therebetween when said fourth frustoconical metal sealing surface is sealingly engaged with said second frustoconical metal sealing surface.

28. The system of claim 20, wherein said first pressure-retaining component further comprises a first frustoconical contact stop surface and said second pressure-retaining component further comprises a second frustoconical contact stop surface that is adapted to contact said first frustoconical contact stop surface as said third frustoconical metal sealing surface sealingly engages said first frustoconical metal sealing surface.

29. The system of claim 28, wherein said third pressure-retaining component further comprises a third frustoconical contact stop surface that is adapted to contact said first frustoconical contact stop surface as said fourth frustoconical metal sealing surface sealingly engages said second frustoconical metal sealing surface.

30. The system of claim 29, wherein a taper angle of at least one of said second and third frustoconical contact stop surfaces is substantially the same as a taper angle of said first frustoconical contact stop surface.

31. The system of claim 20, wherein said first pressure-retaining component comprises a casing hanger, said second pressure-retaining component comprises one of a landing subassembly and a temporary abandonment cap, and said third pressure-retaining component comprises a tieback subassembly.

32. The system of claim 20, wherein said third pressure-retaining component is adapted not to contact said first frustoconical metal sealing surface of said first pressure-retaining component when said third pressure-retaining component is attached to said first end of said first pressure-retaining component and said fourth frustoconical metal sealing surface sealingly engages at least said second frustoconical metal sealing surface.

33. A casing hanger, comprising:
a first metal sealing surface proximate an upper end of said casing hanger, wherein said first metal sealing surface is positioned on an outside tapered surface of a nose of said casing hanger, said outside tapered surface angling downward from said upper end and outward from a centerline of said casing hanger, wherein said first metal sealing surface is adapted to sealingly engage at least one of a metal sealing surface of a landing subassembly and a metal sealing surface of a temporary abandonment cap;
a second metal sealing surface positioned on said outside surface of said nose of said casing hanger between said first metal sealing surface and said upper end of said casing hanger, wherein said second metal sealing surface is adapted to sealingly engage a metal sealing surface of a tieback subassembly; and
a first contact stop surface proximate said upper end of said casing hanger, wherein said first contact stop surface is positioned on an inside tapered surface of said nose of said casing hanger, said inside tapered surface angling downward from said upper end and inward toward said centerline of said casing hanger.

34. The casing hanger of claim 33, wherein said first and second metal sealing surfaces are frustoconical surfaces.

35. The casing hanger of claim 33, wherein said first contact stop surface is adapted to contact a second contact stop surface on at least one of said landing subassembly and said temporary abandonment cap when said first metal sealing surface sealingly engages said metal sealing surface of a respective one of said landing subassembly and said temporary abandonment cap.

36. The casing hanger of claim 35, wherein said first contact surface is a frustoconical surface.

37. The system of claim 33, wherein said first contact stop surface is spaced apart and separate from said first and second metal sealing surfaces.

38. A method, comprising:
attaching a first end of a first pressure-retaining component comprising a first metal sealing surface to a second end of a second pressure-retaining component comprising a second metal sealing surface, wherein said first metal sealing surface is proximate said first end of said first pressure-retaining component and on an inside face thereof, and said second metal sealing surface is proximate said second end of said second pressure-retaining component and on an outside face thereof; and
after attaching said first pressure-retaining component to said second pressure-retaining component, creating a first metal-to-metal seal between said first metal sealing surface and said second metal sealing surface, wherein creating said first metal-to-metal seal comprises:
covering at least a portion of a recessed metal sealing surface of said second pressure-retaining component with at least a portion of said first pressure-retaining component so as to define a gap therebetween, said recessed metal sealing surface being on said outside face of said second pressure-retaining component between said second metal sealing surface and said second end; and
engaging said first metal sealing surface with said second metal sealing surface until a first contact stop surface of said first pressure-retaining component contacts a second contact stop surface proximate said second end of said second pressure-retaining component and on an inside face thereof.

39. The method of claim 38, further comprising:
disengaging said first metal-to-metal seal;
after disengaging said first metal-to-metal seal, detaching said first pressure-retaining component from said second pressure-retaining component;
after detaching said first pressure-retaining component from said second pressure-retaining component, attaching a third end of a third pressure-retaining component comprising a third metal sealing surface to said second end of said second pressure-retaining component, wherein said third metal sealing surface is proximate said third end of said third pressure-retaining component and on an inside face thereof; and
after attaching said third pressure-retaining component to said second pressure-retaining component, creating a second metal-to-metal seal between said third metal sealing surface and said recessed metal sealing surface, wherein creating said second metal-to-metal seal comprises engaging said third metal sealing surface with said recessed metal sealing surface.

40. The method of claim 38, wherein creating said first metal-to-metal seal comprises engaging a first frustoconical sealing surface of said first metal sealing surface with a second frustoconical sealing surface of said second metal sealing surface.

41. The method of claim 39, wherein creating said second metal-to-metal seal comprises engaging a third frustoconical sealing surface of said third metal sealing surface with a recessed frustoconical sealing surface of said recessed metal sealing surface.

42. The method of claim 39, wherein creating said second metal-to-metal seal comprises engaging said third metal sealing surface with said recessed metal sealing surface until a third contact stop surface of said third pressure-retaining component contacts said second contact stop surface of said second pressure-retaining component.

43. The method of claim 38, wherein attaching said first pressure-retaining component to said second pressure retaining component comprises threadably engaging said first pressure-retaining component with said second pressure retaining component.

44. The method of claim 39, wherein attaching said third pressure-retaining component to said second pressure retaining component comprises threadably engaging said third pressure-retaining component with said second pressure retaining component.

45. The method of claim 39, wherein, after creating said second metal-to-metal seal and while being attached to said second pressure-retaining component, said third pressure-retaining component does not contact said second metal sealing surface of said second pressure-retaining component.

46. The method of claim 38, wherein said inside face of said second pressure-retaining component is a tapered surface that angles away from said second end and toward a centerline of said second pressure-retaining component, and wherein said outside face of said second pressure-retaining component is a tapered surface that angles away from said second end and away from said centerline.

47. The system of claim 38, wherein said second contact stop surface is spaced apart and separate from said second and recessed metal sealing surfaces.

\* \* \* \* \*

UNITED STATES PATENT AND TRADEMARK OFFICE
CERTIFICATE OF CORRECTION

PATENT NO. : 9,580,986 B2
APPLICATION NO. : 14/411041
DATED : February 28, 2017
INVENTOR(S) : Hao-Ching Kuo et al.

It is certified that error appears in the above-identified patent and that said Letters Patent is hereby corrected as shown below:

In the Claims

Column 26, Line 20 (Claim 37, Line 1), change "system" to "casing hanger".

Column 28, Line 22 (Claim 47, Line 1), change "system" to "method".

Signed and Sealed this
Eleventh Day of April, 2017

Michelle K. Lee
*Director of the United States Patent and Trademark Office*